US005528888A

United States Patent [19]
Miyamoto et al.

[11] Patent Number: 5,528,888
[45] Date of Patent: Jun. 25, 1996

[54] AUTONOMOUS MOWING VEHICLE AND APPARATUS FOR DETECTING BOUNDARY OF MOWED FIELD

[75] Inventors: Yasuhiko Miyamoto; Toshihiro Nagano, both of Omiya, Japan

[73] Assignee: Fuji Jukogyo Kabushiki Kaisha, Tokyo, Japan

[21] Appl. No.: 362,258

[22] Filed: Dec. 22, 1994

[30] Foreign Application Priority Data

Dec. 27, 1993 [JP] Japan ................................ 5-330193
Dec. 27, 1993 [JP] Japan ................................ 5-330194

[51] Int. Cl.$^6$ .................................................. A01D 34/82
[52] U.S. Cl. .................................... 56/10.2 F; 364/424.07
[58] Field of Search .......................... 56/10.2 F, 10.2 A, 56/10.2 D; 180/167, 168, 169; 364/424.02, 424.07

[56] References Cited

U.S. PATENT DOCUMENTS

| | | | |
|---|---|---|---|
| 3,425,197 | 2/1969 | Kita | 56/10.2 F |
| 4,573,547 | 3/1986 | Yoshimura et al. | 56/10.2 A X |
| 4,777,785 | 10/1988 | Rafaels | 56/10.2 A |

FOREIGN PATENT DOCUMENTS

| | | | |
|---|---|---|---|
| 0028184 | 2/1980 | Japan | 56/10.2 A |
| 1-312610 | 12/1989 | Japan . | |
| 4-39286 | 6/1992 | Japan . | |
| 5-47161 | 7/1993 | Japan . | |

*Primary Examiner*—Terry Lee Melius
*Attorney, Agent, or Firm*—Martin A. Farber

[57] ABSTRACT

An apparatus for detecting a extending boundary between fields mowed and not mowed by an cutting blade mechanism of an autonomous vehicle for the mowing of lawn grass, comprises a plurality of rocking members provided to be aligned in a lateral direction of the vehicle under a body of the vehicle, a plurality of rocking condition sensors provided to detect rocking conditions of the respective rocking members, and a control unit provided to determine a boundary between a rocking member rocked by taller lawn grass and a rocking member not rocked as the boundary between the mowed field and not mowed field in response to signals from the rocking condition sensors. There is further provided a method for shifting the vehicle to a ready position of a next lane to be mowed in the work area based on the result of the detection by the boundary detecting apparatus.

15 Claims, 21 Drawing Sheets

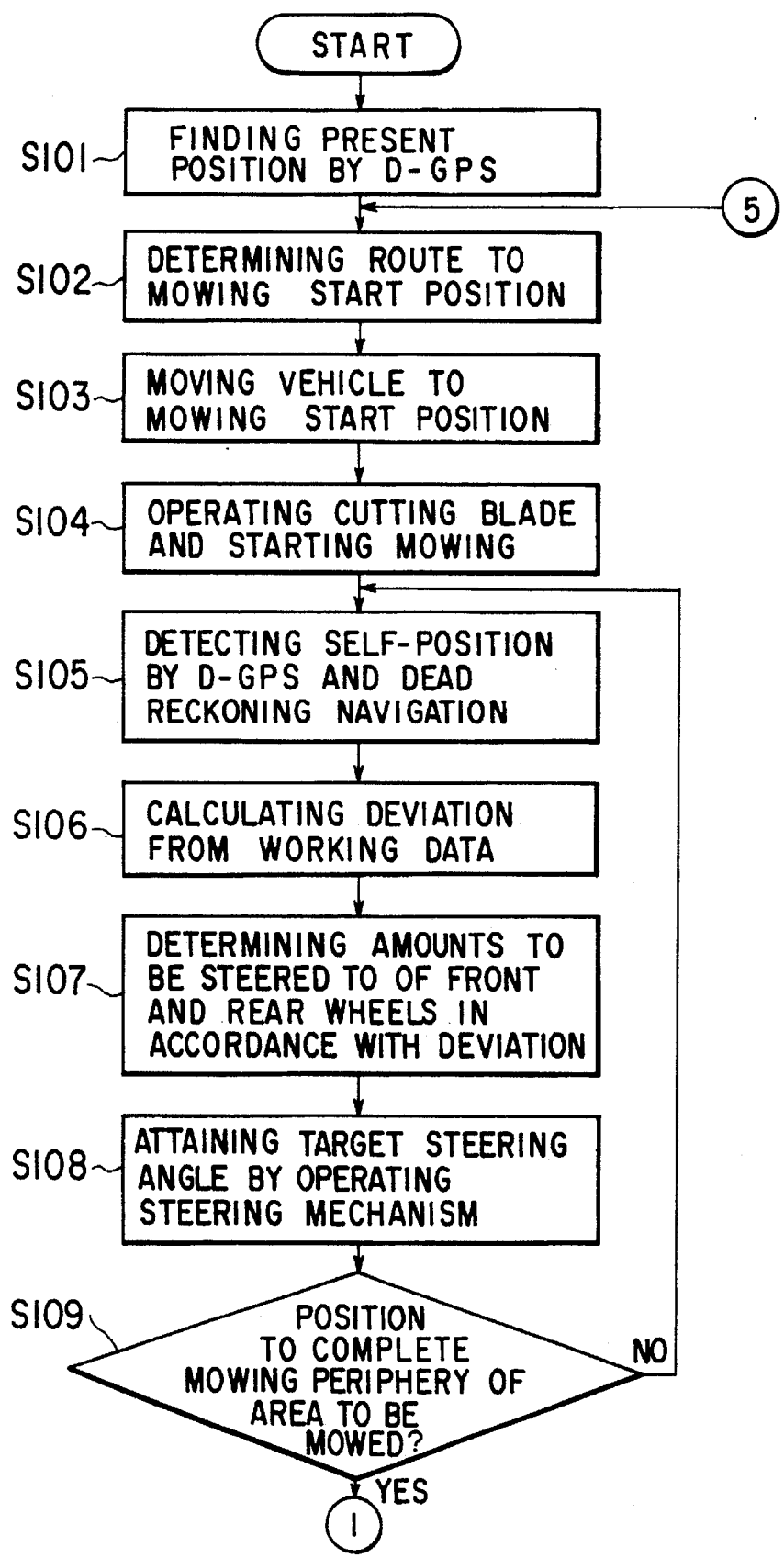

AUTONOMOUS MOWING VEHICLE AND APPARATUS FOR DETECTING BOUNDARY OF MOWED FIELD

BACKGROUND OF THE INVENTION

The present invention relates to an autonomous mowing vehicle and an apparatus for detecting a boundary between a field which already has been mowed by the autonomous mowing vehicle and a field which has not been mowed yet.

Japanese laid-open patent application No. 1-312610 proposes a system for detecting a self-position of an autonomous mowing vehicle, using a magnetic sensor which detects the magnetic field generated by a cable buried under the ground. However, it is difficult to bury cables throughout a large area, such as a golf course, riverbed or park, for the autonomous running of an unmanned mowing vehicle. Even if it is possible to do this, the cost runs up.

To resolve this problem, several systems which detect a boundary between a mowed field and an unmowed field to be followed by the autonomous mowing vehicle, have been developed.

As a first example of such systems, Japanese laid-open patent application No. 61-139304 introduces a system which detects a boundary between mowed and not mowed fields to be followed by an autonomous mowing vehicle by binarizing an image picture including the boundary sensed by a camera with respect to averaged lightness and analyzing the binarized image picture.

However, this system must be expensive because of the provision of a camera and image processing unit. Furthermore, cleaning and maintenance of the camera is frequently needed because splashed mud or dust adhering on a camera lens prevents taking clear images. It is also inconvenient that the camera is not resistant to against water.

Japanese published patent application No. 4-39286 introduces a second example including a plurality of optical sensors, as the type of photointerrupter, secured to a front frame and a rear frame of a mowing vehicle, aligning in a lateral direction thereof. Each sensor is composed of a light emitting element and a light receiving element facing each other through a slit in the lateral direction of the mowing vehicle to detect the presence or absence of the lawn grass therebetween. The system determines that the mowing vehicle is surely following a boundary between mowed and not mowed fields when, simultaneously, one of the optical sensor detects the presence of the lawn grass and another one of the sensor detects the absence of the lawn grass.

In this second example, however, splashed mud or dust adhering on a surface of at least one of the light emitting element and the light receiving element may affect the passage of light therebetween, which causes erroneous determinations that the lawn grass is present even if it is actually absent. Furthermore, such optical sensors rigidly secured on the frames of the mowing vehicle are required to be positioned at a particular height from the ground to prevent the sensors from being damaged by hitting the ground. However, if the sensors are so positioned, it is impossible to detect the boundary in the case where height of the lawn grass to be mowed is relatively short, for instance, in the case of mowing the green of the golf course.

SUMMARY OF THE INVENTION

The present invention proposes to resolve the foregoing defects of the prior art. The main object of the present invention is providing a boundary detecting system for an autonomous mowing vehicle which can certainly detect a boundary between mowed and not mowed fields without being affected by the work environment, namely, by splashed mud or dust for instance.

Another object of the present invention is providing a boundary detecting system which can certainly detect the boundary irrespective of height of the lawn grass.

Further another object of the present invention is providing an autonomous mowing vehicle running along a boundary between mowed and not mowed fields when the presence of such boundary is recognized and making a shift to a next lane to be mowed when the absence of the boundary is recognized so as to continue the mowing throughout the work area.

More specifically, according to the present invention, there is provided an apparatus for detecting an extending boundary between fields mowed and not mowed by a cutting blade mechanism of an autonomous vehicle for the mowing of lawn grass, comprising a plurality of rocking members provided to be aligned in a lateral direction of the vehicle under a body of the vehicle, a plurality of rocking condition sensors provided to detect rocking conditions of the respective rocking members, and a control unit provided determine a boundary between a rocking member rocked by lawn grass and a rocking member not rocked as the boundary between the mowed field and the not mowed field in response to signals from the rocking condition sensors.

Furthermore, according to the present invention, there is provided an autonomous mowing vehicle having a body and at least one cutting blade under the body, comprising boundary detection means for detecting a field mowed by the cutting blade and a field not mowed by the cutting blade, boundary recognition means for recognizing presence and absence of a boundary between the mowed field and the not mowed field detected by the boundary detection means, and running control means for controlling the vehicle so as to run along the boundary when the presence of the boundary is recognized by the boundary recognition means and to shift the mowing lane when the absence of the boundary is recognized by the boundary recognition means.

Other objects, advantages and novel features of the present invention will become apparent from the following detailed description of the invention when considered in conjunction with the accompanying drawings,

BRIEF DESCRIPTION OF DRAWINGS

FIGS. 9a–9d are flow charts of a main control routine of the control system.

DETAILED DESCRIPTION OF THE PREFERRED EMBODIMENTS

Referring to the foregoing drawings, the preferred embodiments of the present invention will be described hereinafter.

Figure 1A:
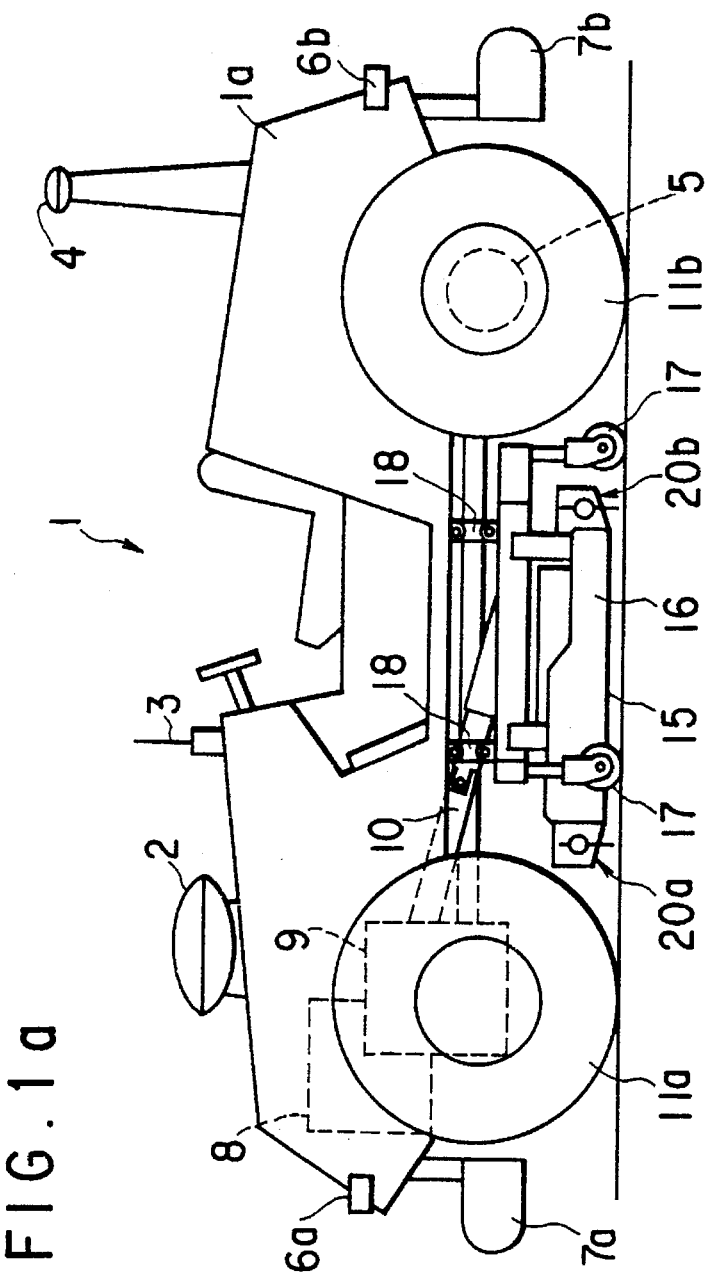
FIG. 1a is a diagram illustrating an autonomous mowing vehicle having a mobile station of the Differential Global Positioning System (D-GPS).

In FIG. 1a, a reference numeral 1 indicates an unmanned autonomous mowing vehicle for autonomously performing the mowing of a grass field like a golf course. According to the present invention, the autonomous running of the autonomous mowing vehicle 1 having an engine as a power source is precisely performed by individually controlling steering angles of front and rear wheels of the mowing vehicle 1 by means of a satellite waves receiver for receiving wave from a satellite for analyzing self-position, a sensor for the dead reckoning navigation based on a past driven route, a sensor for detecting obstacles and a sensor for detecting a boundary between mowed and not mowed fields to be followed by the mowing vehicle 1.

The foregoing satellite wave receiver is a GPS (Global Positioning System) receiver for receiving waves from GPS satellites to find the self-position, especially, a mobile station GPS receiver for the Differential GPS (D-GPS), to which differential information about the self-position is fed from a fixed station.

Figure 1B:
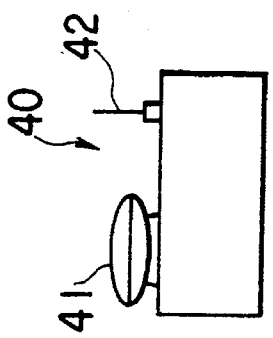
FIG. 1b is a diagram illustrating a fixed station of the D-GPS used for the autonomous mowing vehicle.

Error of findings by the GPS are caused mainly by the so-called Selectable Availability (S/A) where a user intentionally degrades the accuracy of findings, and further by the clock difference between the satellites and the receiver, error of orbits of the satellites, or delay of waves due to ionosphere or atmosphere, Errors having same phase can be canceled by using differential information of each satellite caught at the known fixed station, which causes an increase on the accuracy of findings at the mobile station up to about a number of meters, Thus, the mowing vehicle 1 is provided with an antenna 2 of the mobile station GPS receiver and an antenna 3 of the wireless communication device to receive differential information from the fixed station. At a known place outdoors, as shown in FIG. 1b, there is provided at the fixed station 40 an antenna 41 of the GPS receiver and an antenna 42 of the wireless communication device to transmit differential information to the mobile station GPS receiver.

As a sensor for the dead reckoning navigation, a earth magnetism sensor 4 and a wheel encoder 5 as an example of a vehicle speed sensor are provided. As a sensor for detecting obstacles on a running path, contactless sensors 6a and 6b like a supersonic sensor or optical sensor are furnished at front and rear portions of the mowing vehicle 1 and contact sensors 7a and 7b using microswitches are furnished at front and rear ends of the mowing vehicle 1.

Figure 2:
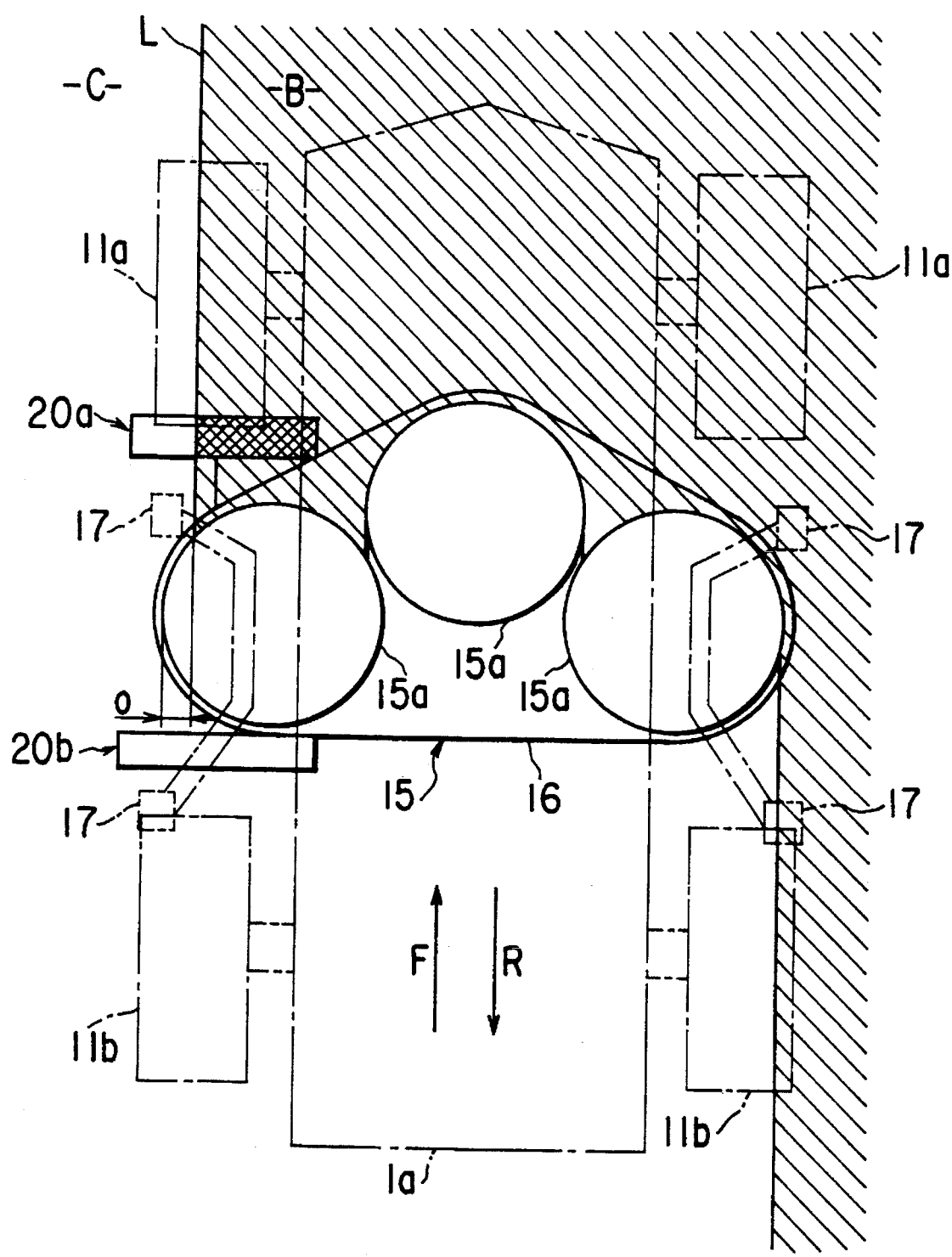
FIG. 2 is a plan view of the mowing vehicle showing the positional relationship between a cutting blade mechanism and a boundary detecting device of the mowing vehicle.

Furthermore, the mowing vehicle 1 is provided under its body with a cutting blade mechanism 15 like a mowing vehicle including a plurality of cutting blades 15a as shown in FIG. 2 to perform mowing and boundary detecting devices 20a and 20b to detect a boundary L between a mowed field C and a not mowed field B at a work area of the mower.

Casters 17 are furnished at four corners of a deck of the cutting blade mechanism 15. The cutting blade mechanism 15 is installed under the body 1a through a link mechanism 18 to keep the clearance between the ground and the cutting blades 15a approximately constant (a few inches) and to absorb the displacement between the cutting blade mechanism 15 and the body 1a. Moreover, it is so constructed as to transmit power to the cutting blade mechanism 15 through a PTO shaft of a transmission 9 in a power transmission mechanism which transmits power from an engine mounted on the vehicle to front and rear wheels 11a and 11b, a hydraulic clutch mechanism not shown and an universal joint 10 in order to rotate each cutting blade 15a through a transmitting mechanism not shown to perform the mowing.

The boundary detecting devices 20a and 20b are respectively mounted on the front and rear of the deck 16 of the cutting blade mechanism 15 on the left side thereof under the body 1a. The boundary detecting devices 20a and 20b are composed of a plurality of particular mechanisms arranged in parallel in the lateral direction of the body to detect the difference of height of the lawn grass between the mowed field C and the not mowed field B.

Figure 3:
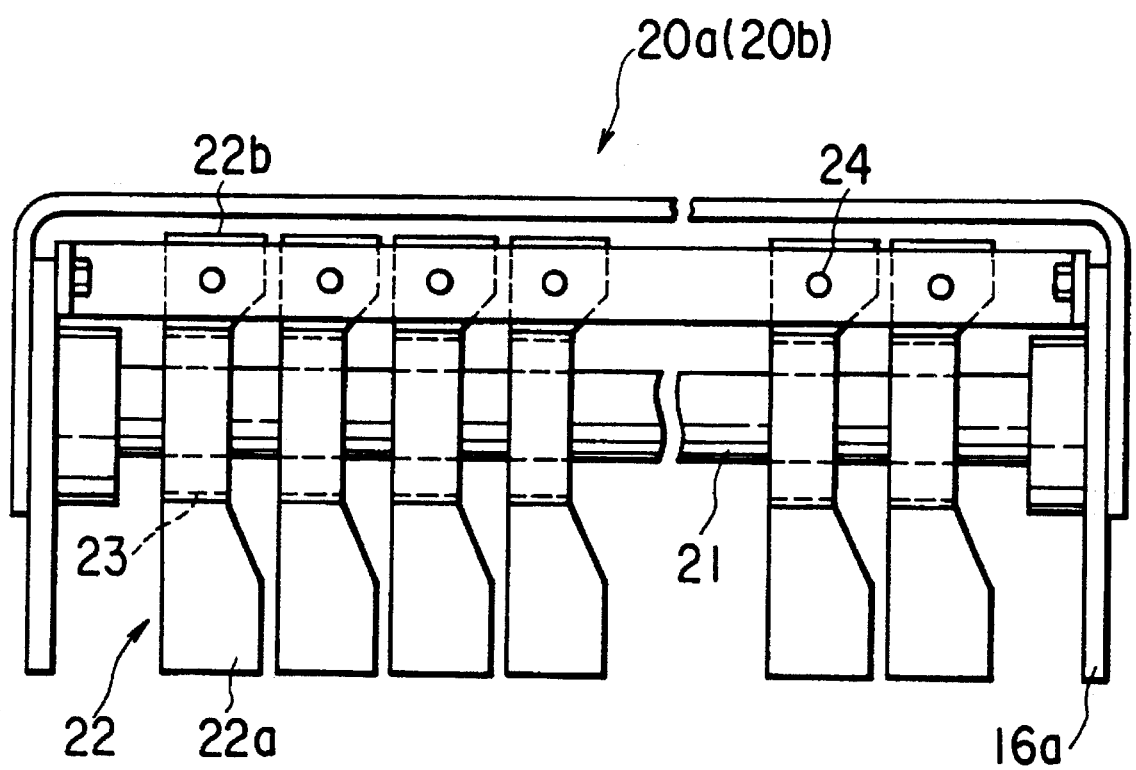
FIG. 3 is a front view of the boundary detecting device.

As shown in FIG. 3, each of such particular mechanisms is composed of a plurality of long strips of rocking members 22 being rotatably mounted through bearings 23 on a shaft 21 with the predetermined axial pitch (of 30 mm, for example), which shaft is secured to a frame 16a extending from the deck 16 and arranged to extend in the lateral direction of the body. Each of the rocking members 22 is constructed by an upper portion as a switching portion 22b and a lower portion as a sensing portion longer than the upper portion. The center of gravity is on the side of the sensing portion 22a with respect to a rocking center so that the sensing portion 22a is always hung down. The lower end of the sensing portion 22a of each rocking member 22 is at a height approximately the same as or a little bit higher than the minimum ground clearance of the cutting blade 15a of the cutting blade mechanism. Furthermore, the weight of each rocking member 22 is of such an extent as not to depress the lawn grass.

Microswitches 24 as an example of a rocking state detecting sensor are provided opposite to respective switching portions 22b with a predetermined separation in the longitudinal direction of the vehicle when the rocking members 22 are vertically hung down.

Figure 4A:
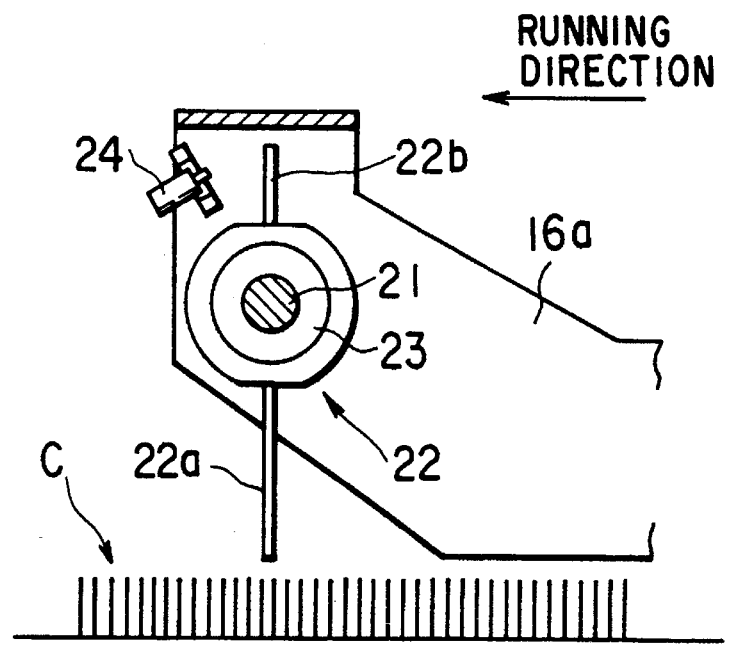
FIG. 4a is a side view of the boundary detecting device passing over a lawn grass field which has already been mowed.
Figure 4B:
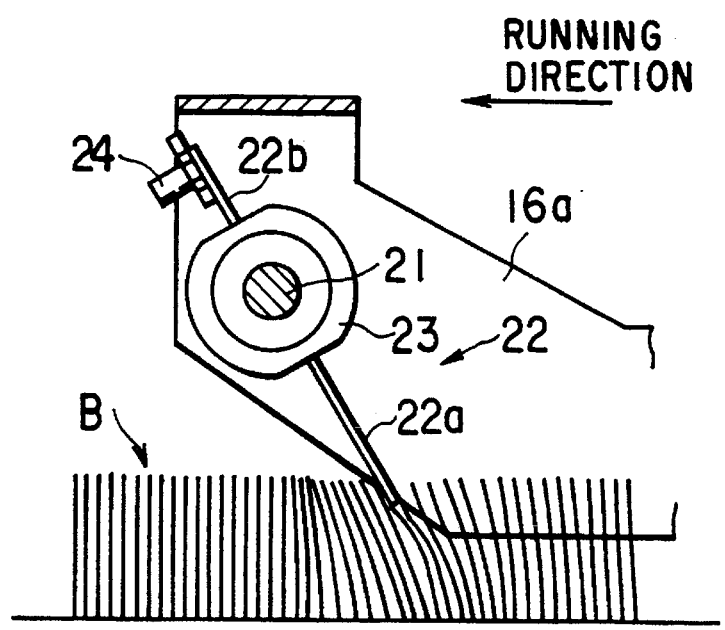
FIG. 4b is a side view of the boundary detecting device passing over a lawn grass field which has not been mowed yet.
Figure 5:
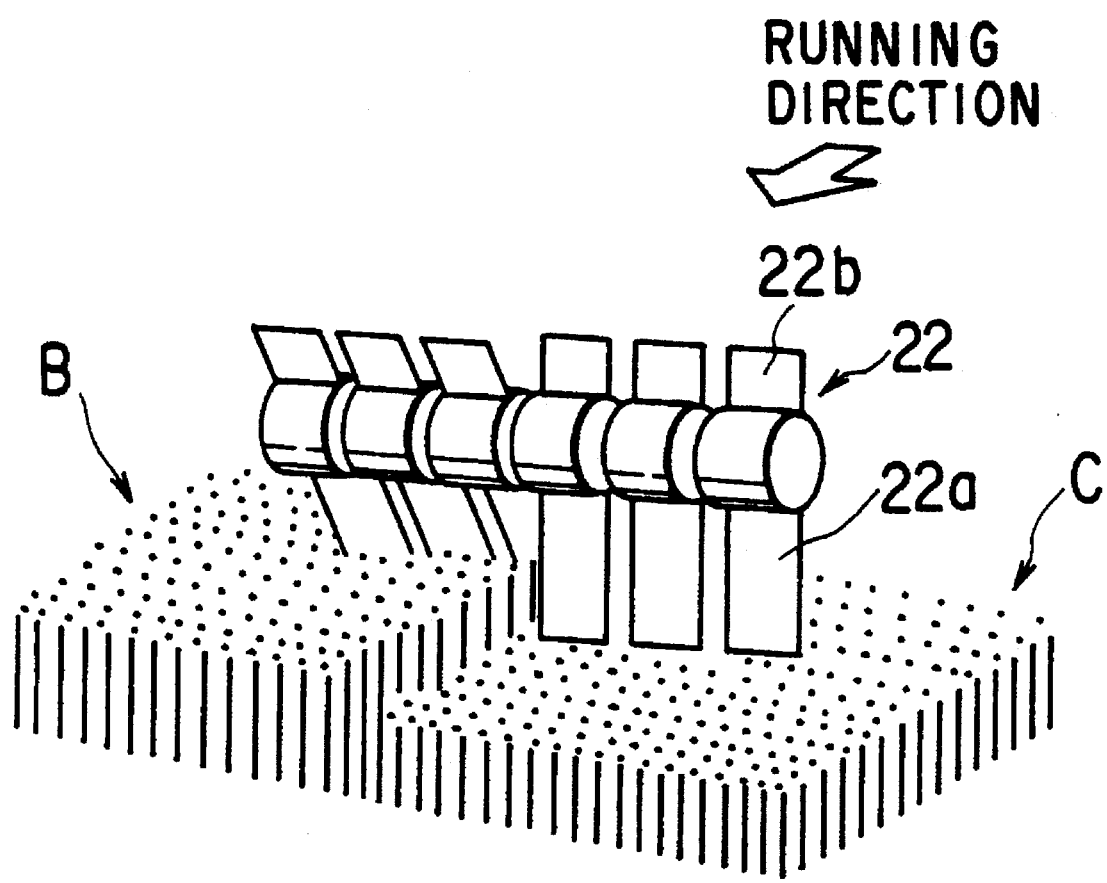
FIG. 5 is a diagram showing the operation of the boundary detecting device passing over the boundary of fields.

As shown in FIG. 4a, in the case where the rocking member 22 is positioned over the mowed field C, because, as mentioned above, the lower end of the sensing portion is at approximately same height as the minimum ground clearance of the cutting blade 15a, the rocking member 22 maintains its vertically hanging state without any contact with the lawn grass or, even if there is any contact, the rocking angle is very small, whereby the switching portion 22b can not come into contact with the corresponding microswitch 24, turning the microswitch 24 OFF. In contrast to this, as shown in FIG. 4b, in the case where the rocking member 22 is positioned over the not mowed field B during the vehicle running, tall lawn grass causes the rocking member 22 to swing, resulting in that the switching portion 22b of the rocking member 22 comes into contact with the corresponding microswitch 24 to turn it ON. Accordingly, where a plurality of rocking members 22 are aligned in a direction perpendicular to the running direction of the vehicle, namely, lateral direction of the vehicle as shown in FIG. 5, the rocking members 22 over the mowed field rotates to turn the corresponding microswitches 24 ON and the rocking members 22 over the not mowed field do not rotate or rotate little. Thus, a boundary L between the mowed field C and the not mowed field B with respect to the vehicle position is determined by detecting a boundary between the microswitches 24 in ON state and the microswitches 24 in OFF state.

In the present embodiment, although the microswitch 24 is used as an example of the rocking state detecting sensor to detect the rocking state of the rocking member 22, it is possible to use a type of contact sensor which operates in the same way as the microswitch or a type of contactless sensor such as a proximity switch which is turned ON when something comes close.

Further, in the present embodiment, as shown in FIG. 2, each of the boundary detecting devices 20a and 20b is positioned straddling the tangential line longitudinally extending at a left edge of the cutting blade 15a on the left hand side. Accordingly, the mowing can be performed always looking at the mowed field on the left side of the body 1a and the boundary L between the mowed field and the not mowed field detected by the boundary detecting devices 20a and 20b can be situated on the right side of such tangential line to create a predetermined mowing overlap O during the mowing from lane to lane along the boundary.

Figure 6:
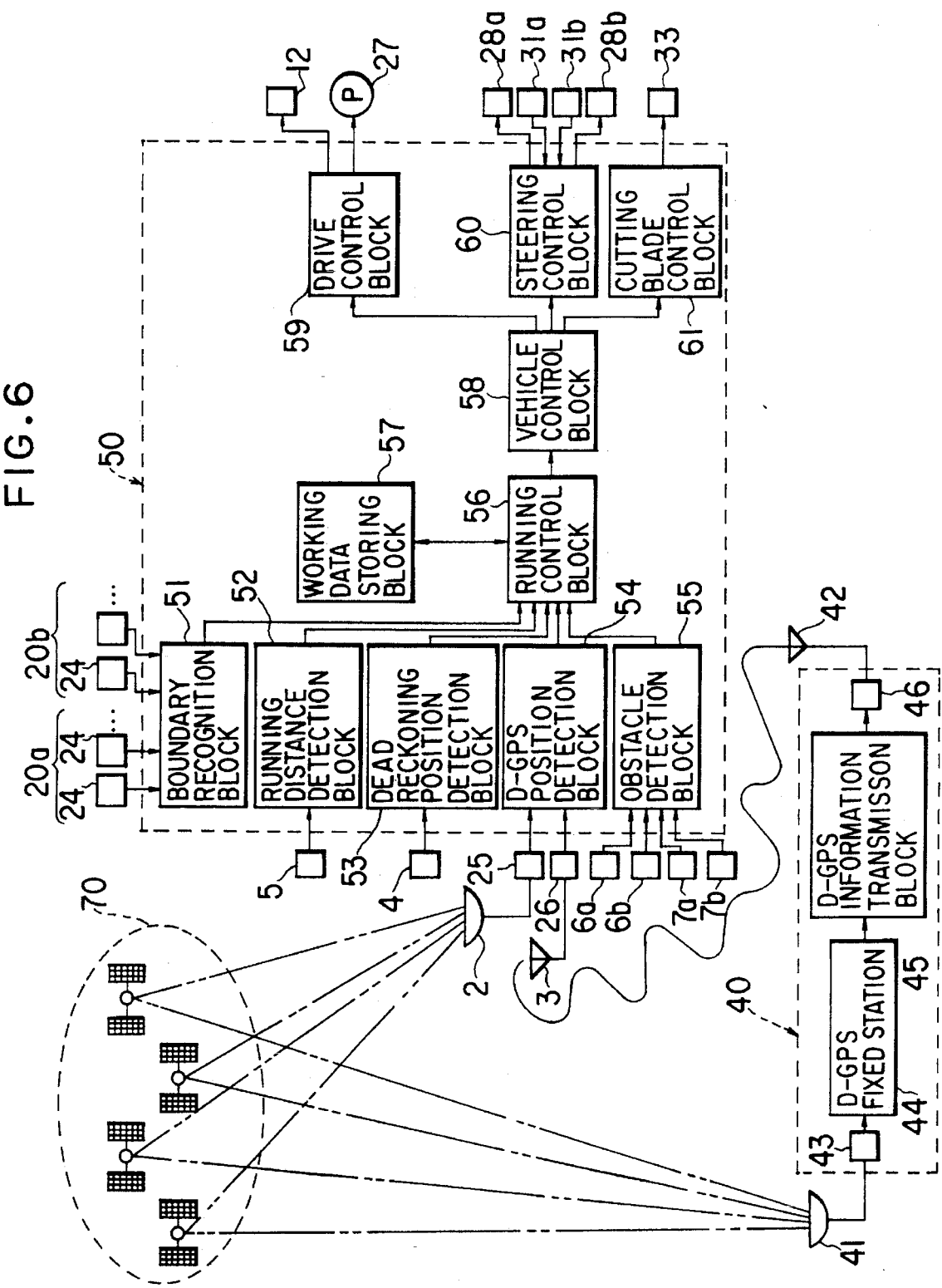
FIG. 6 is a block diagram of a control system of the autonomous mowing vehicle.

Moreover, as shown in FIG. 6, a control unit 50 composed of a microcomputer is installed on the mowing vehicle 1. Sensors, actuators, a mobile station GPS receiver 25 and a wireless communication device 26 for receiving differential information from a fixed station 30 are connected to the control unit 50 to perform a self-position finding function by the D-GPS, a self-position finding function by the dead reckoning navigation and a autonomous running control function. The control unit 50 performs those functions by using control programs and data stored in memories therein.

The control programs and data in the control unit 50 are typically described in block form. In detail, the control unit 50 comprises a boundary recognition block to which the microswitches 24 of the boundary detecting devices 20a and 20b are connected, a running distance detection block 52 to which the wheel encoder 5 is connected, a dead reckoning position detection block 53 to which the earth magnetism sensor 4 is connected and which uses running distance data from the running distance detection block 52, a D-GPS position detection block 54 to which the mobile station GPS receiver 25 and the communication device 26 are connected, an obstacle detection block 55 to which the contactless sensors 6a and 6b and contact sensors 7a and 7b are connected, a running control block to which the recognition block 51 and the detection blocks 52–55 are connected, a work data storing block 57 storing work data and maps to be referred to by the running control block 56, and a vehicle control block 58 which controls running conditions of the vehicle in response to the instruction from the running control block 56. The control unit 50 further comprises a drive control block 59, a steering control block 60 and a cutting blade control block 61 to drive respective mechanisms of the mowing vehicle 1 based on the output from the vehicle control block 58.

The boundary recognition block 51 selects one of the boundary detection devices 20a and 20b based on data indicating the running direction of the vehicle and determines a boundary of lawn grass height by processing signals from the microswitches 24 of the the selected boundary detection device to output positional data of the boundary to the running control block 56.

The running distance detection block 52 calculates a running distance of which the vehicle has run, by integrating vehicle speed detected by the wheel encoder 5 to supply it to the dead reckoning position detection block 53 and the running control block 56.

The dead reckoning position detection block 53 finds a present position of the vehicle by calculating a route which the vehicle has run from a reference point or start point, based on the running distance calculated by the running distance detection block 52 and the change in the running direction detected by the earth magnetism sensor 4, and outputs found data to the running control block 56. Instead of the earth magnetism sensor 4, a gyroscope may be used as a sensor connected to the dead reckoning position detection block 53.

The D-GPS position detection block 54 precisely finds a position of the vehicle in accordance with navigation messages from a group of satellites 70 (at least four satellites being required for three-dimensional findings) at least three satellites being required for two-dimensional findings) caught through the mobile station GPS receiver 25 and the differential information from the fixed station 40 received through the wireless communication device 26, and outputs found data to the running control block 56. Such navigation messages include clock correction coefficients of the satellites, information about orbit, calendar of the satellites, information such as disposition of the satellites or the like.

The fixed station 40 incorporated with the D-GPS position detection block 54 is composed of a D-GPS fixed station block 44 connected to a fixed station GPS receiver 43 and a D-GPS information transmission block 45 for transmitting the differential information from the D-GPS fixed station block 44, and a wireless communication device 46 connected to the D-GPS information transmission block 45.

The D-GPS fixed station block 44 produces differential correction data by processing the information from the group of satellites 70 received through the fixed station GPS receiver 43. Such the differential correction data is converted to packed data for wireless communication by the D-GPS information transmission block 45 and sent through the wireless communication device 46.

Although the fixed station 40 for the D-GPS is provided specially for the mobile station on the mowing vehicle in the present embodiment, the existing D-GPS fixed station having a wireless station transmitting the differential information or the existing D-GPS fixed station transmitting the differential information through communication satellites can be used.

The obstacle detection block 55 detects obstacles on the running path by the contactless sensors 6a and 6b and contact sensors 7a and 7b and outputs detected signals to the running control block 56.

The running control block 56 calculates a deviation between a present portion of the vehicle and a target position by selectively using data supplied from the boundary recognition block 51, the running distance detection block 52, the dead reckoning position detection block 53 and the D-GPS position detection block 54, and the work data referred from the work data storing block 57, in order to determine a route which the vehicle should run and an instruction for the control of the vehicle.

When the vehicle moves to the work area, the running control block 56 compares the accuracy of findings by the D-GPS position detection block 54 with a predetermined level. If the predetermined level is satisfied, data detected by the D-GPS position detection block 54 is used to perform the autonomous running control. If the predetermined level is not satisfied, data detected by the dead reckoning position detection block 53 is used to perform the autonomous running control. During the mowing at the work area, the running control block 56 uses boundary recognition data supplied from the boundary recognition block 51, running distance data from the running distance detection block 52 and vehicle speed data in order to control the autonomous running along the detected boundary. When any obstacle is detected by the obstacle detection block 55, the running control block 56 provided an instruction to go around the obstacle or stop the vehicle.

The work data storing block 57 is constructed by a ROM area storing fixed data and a RAM area storing work data for the prosecution of the control. The ROM area preliminarily stores topographical data about each work area to be mowed and topographical data about an entire working region including a plurality of work areas.

The vehicle control block 58 converts the instruction supplied from the running control block 56 into appropriate control instruction amounts to be output to the drive control block 59, steering control block 60 and cutting blade control block 61, respectively. The drive control block 59 controls actuators 12 for the running control such as an actuator for the gear shift, an actuator for the changeover between forward and reverse drives, a throttle actuator and a brake actuator. The drive control block 59 also controls a hydraulic pump 27 to generate hydraulic pressure used to drive each mechanism. The steering control block 60 achieves the steering control (feedback control to a target steering angle) by operating a hydraulic control valve 28a for the front wheel steering and a hydraulic control valve 28b for the rear wheel steering by reference to inputs from a front wheel steering angle sensor 31a and a rear wheel steering angle sensor 31b, respectively. The cutting blade control block 61 controls the operation of the cutting blade 15 by manipulating the aforementioned hydraulic clutch mechanism through a hydraulic control valve 33 for the cutting blade control.

Figure 7:
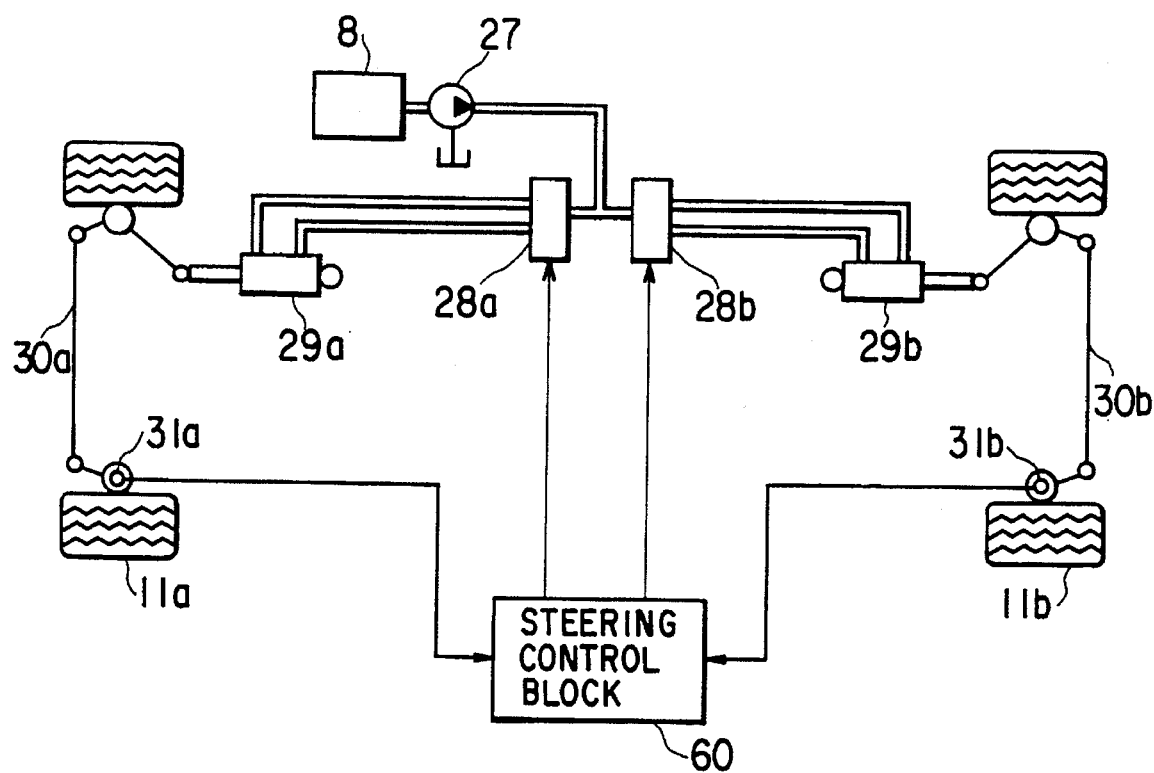
FIG. 7 is a diagram illustrating a steering mechanism of the autonomous mowing vehicle.

FIG. 7 shows a steering system of the mowing vehicle, in which the hydraulic pump 27 driven by the engine 8 supplies oil to the hydraulic valve 28a for the front wheel steering and hydraulic valve 28b for the rear wheel steering to which a front wheel hydraulic cylinder 29a and a rear wheel hydraulic cylinder 29b are connected, respectively. Thus, a front wheel steering mechanism 30a and a rear wheel steering mechanism 30b can be independently manipulated by the hydraulic cylinders 20a and 20b, respectively.

In response to inputs indicating front and rear steering angles detected by the respective steering angle sensors 31a and 31b, the steering control block 60 controls the operation of the respective steering mechanisms 30a and 30b through the respective hydraulic valves 28a and 28b so as to reduce a deviation between the detected steering angle and a target steering angle.

Figure 8:
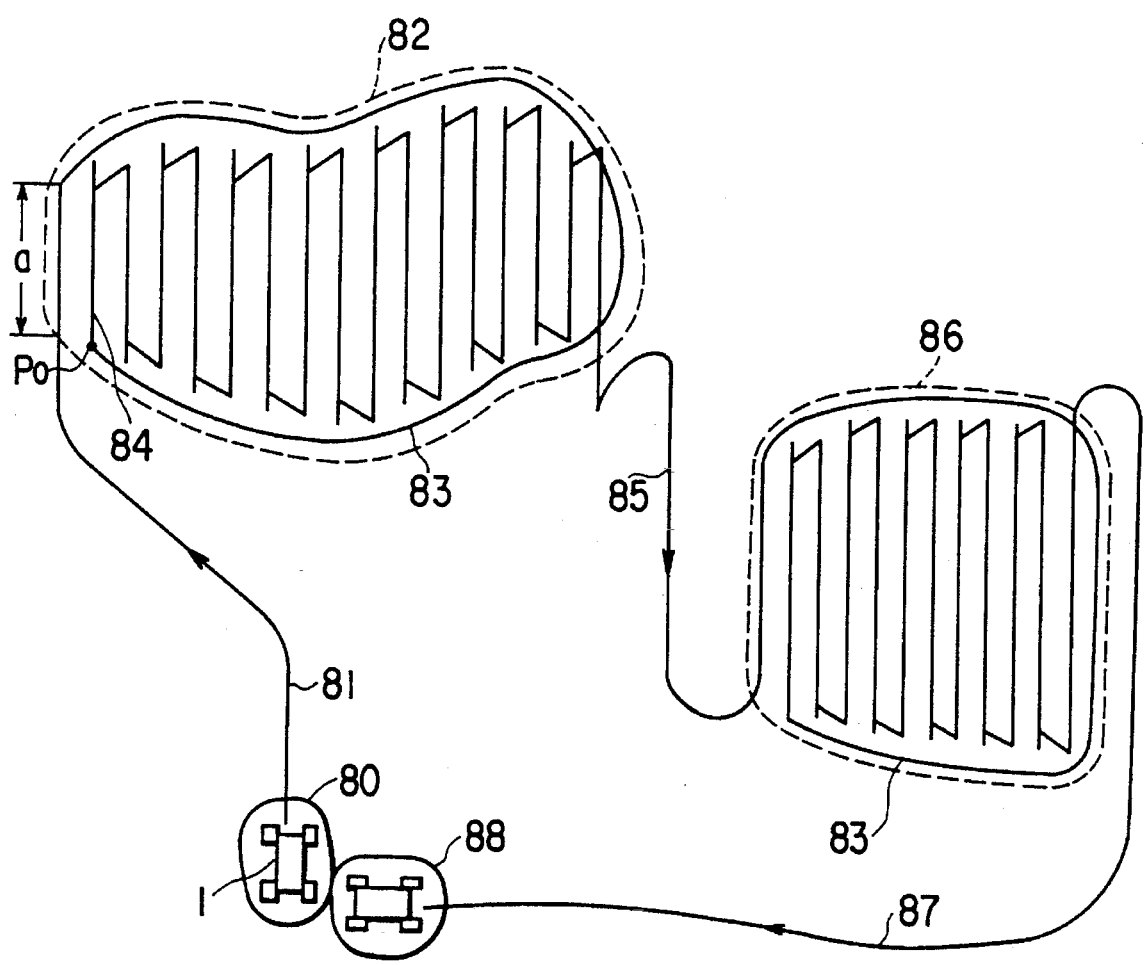
FIG. 8 is a diagram illustrating a running route and work field of the autonomous mowing vehicle.
Figure 9B:
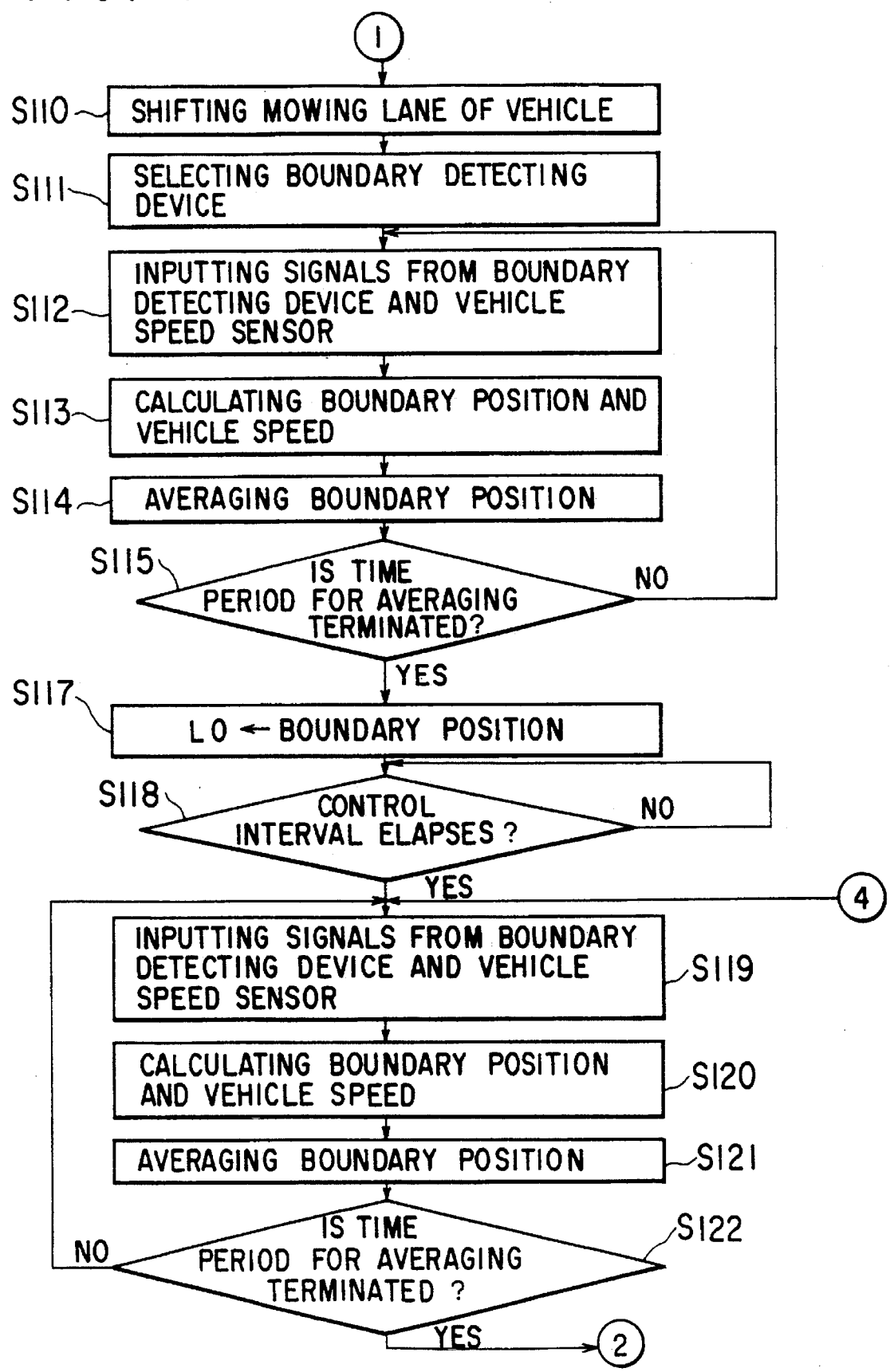
Figure 9C:
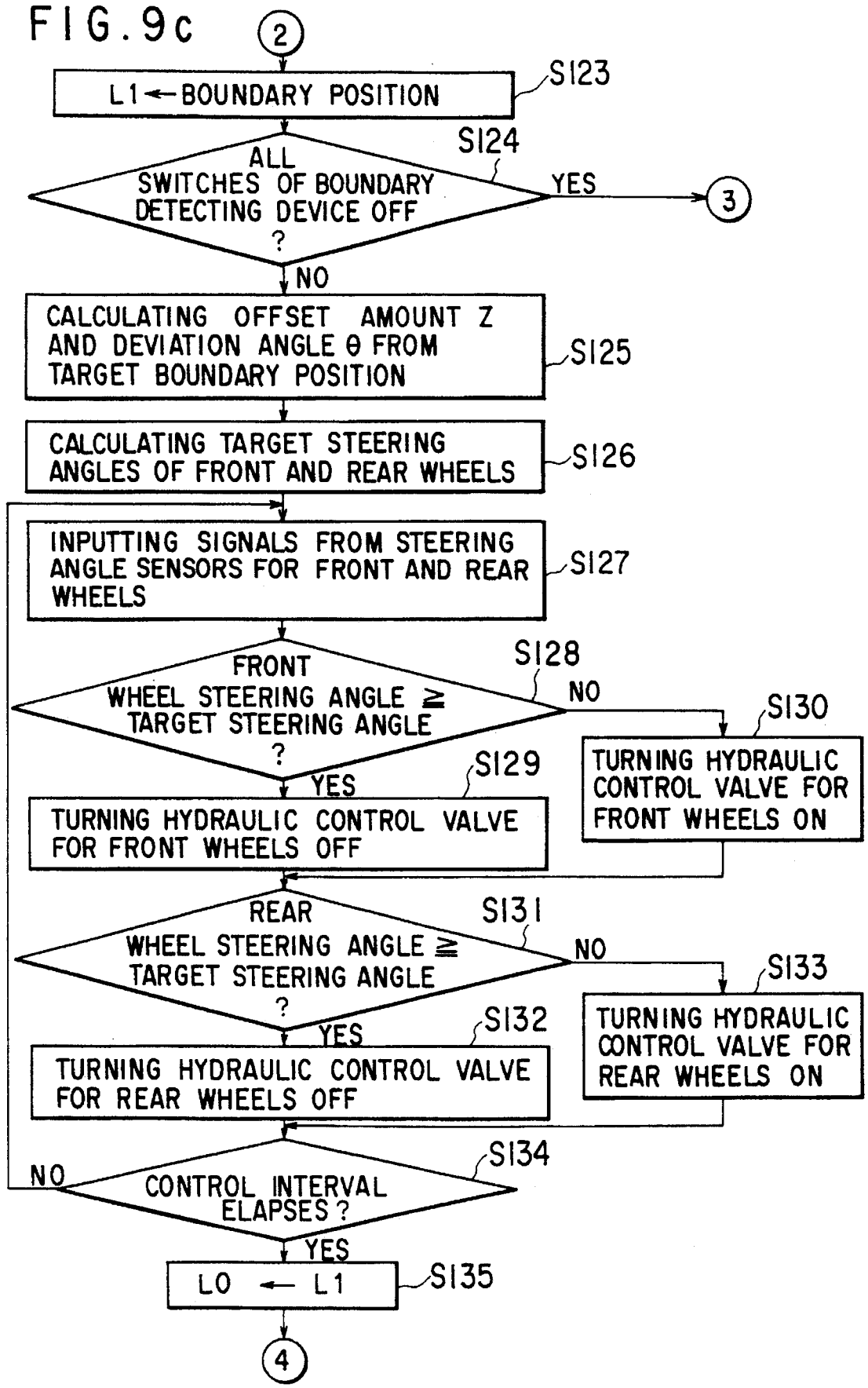
Figure 9D:
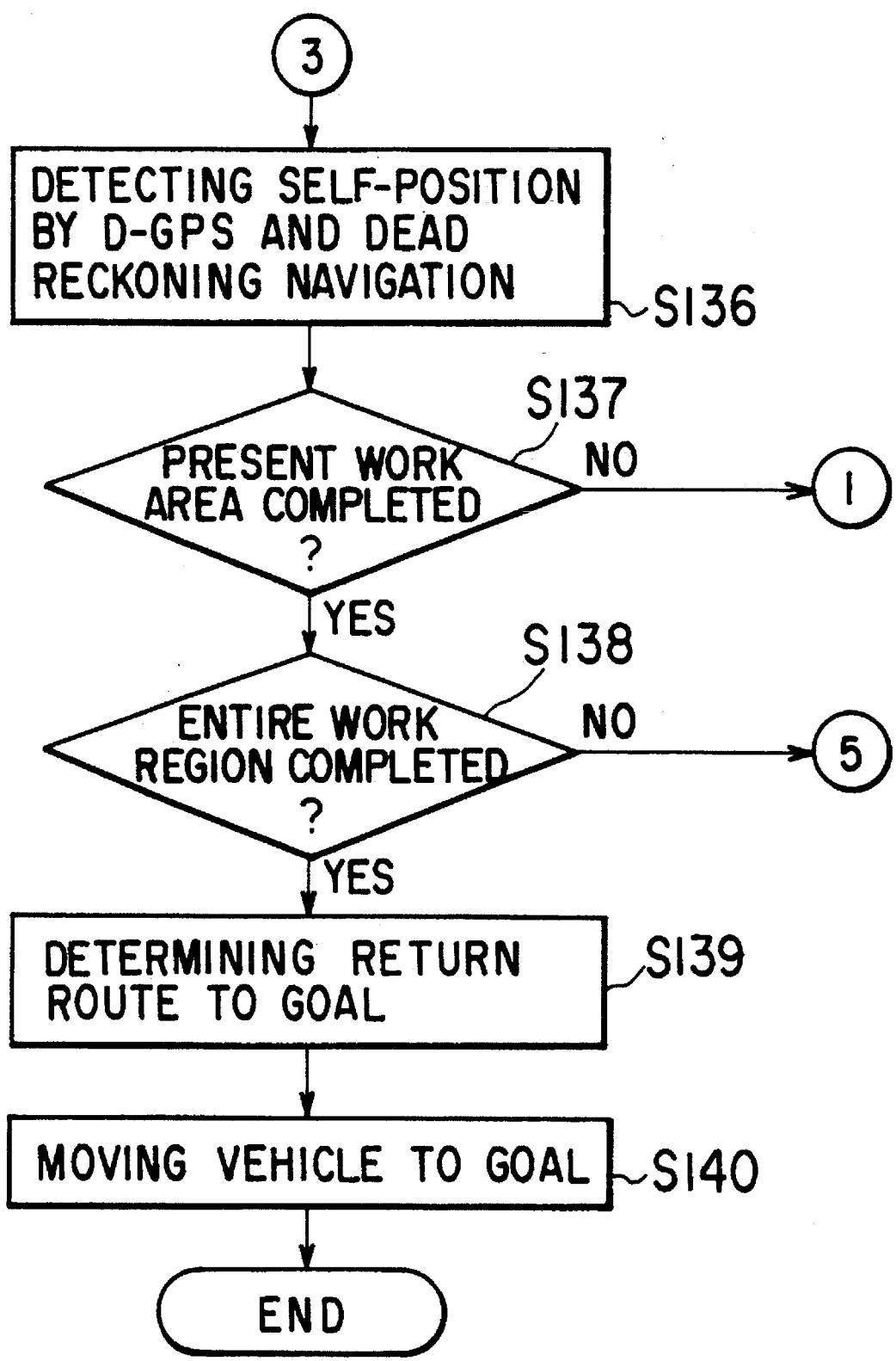
Figure 10A:
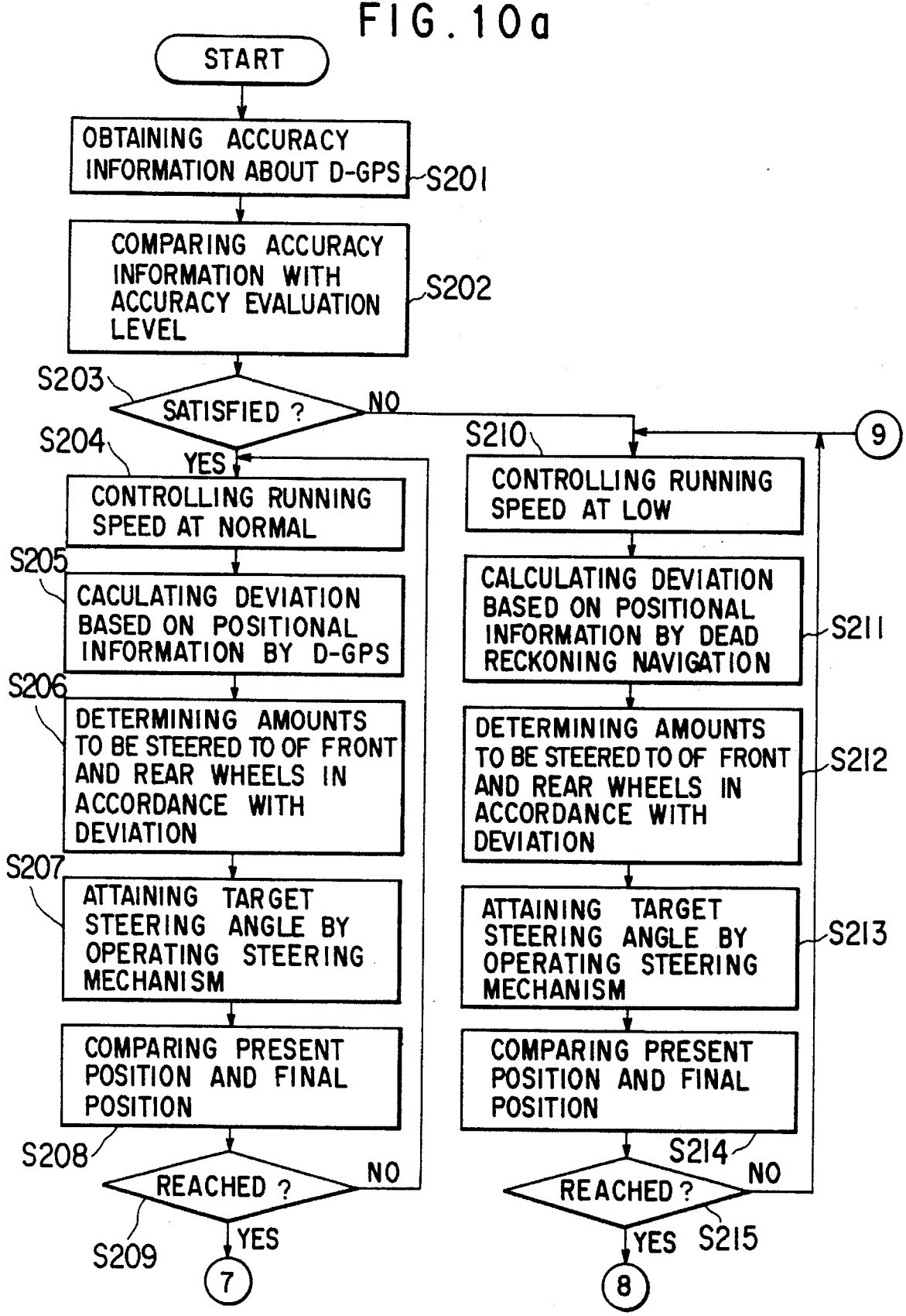
FIGS. 10a–10b are flow charts of a autonomous running control routine.
Figure 10B:
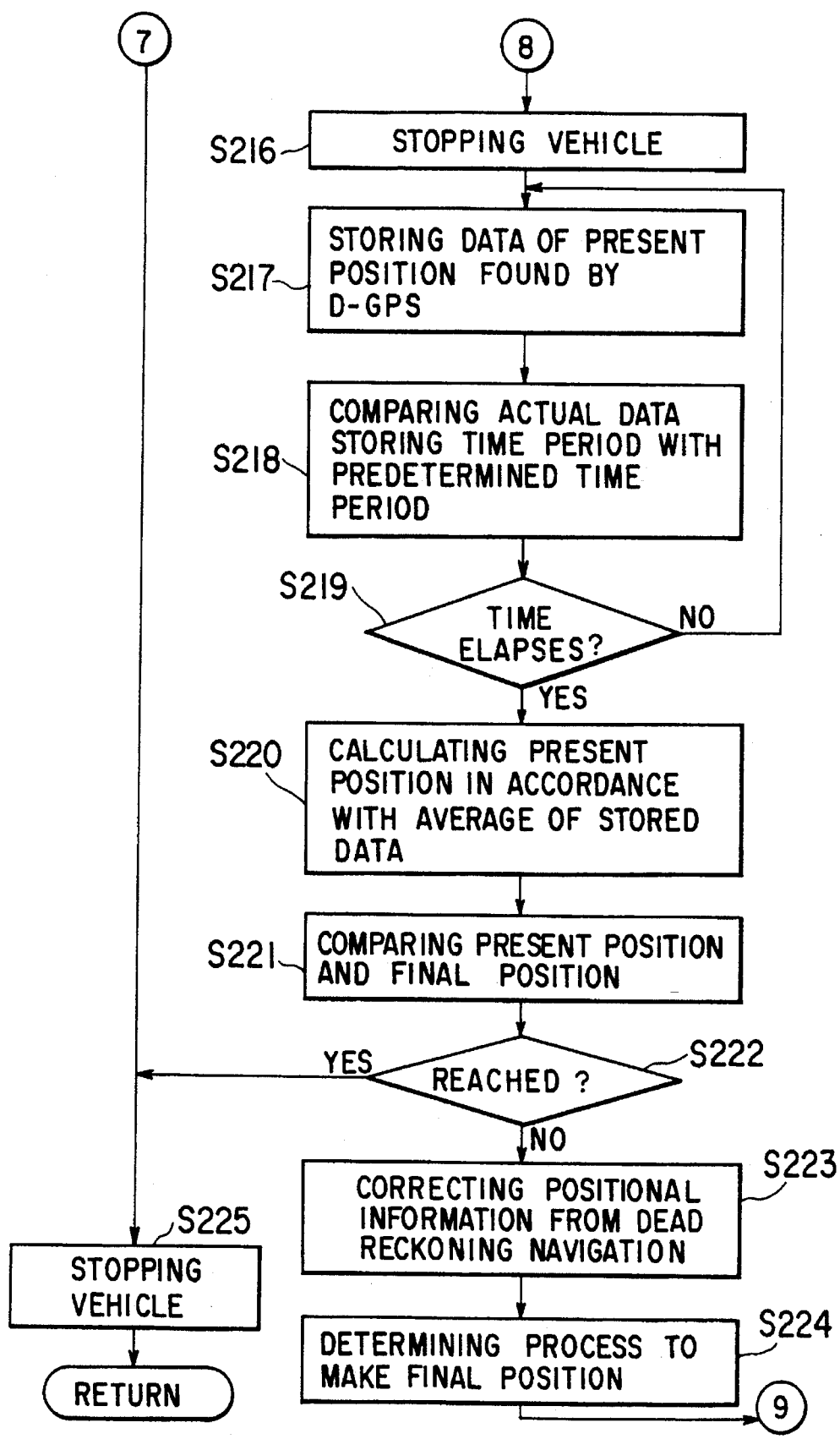

The operation in the case where the mowing is performed at a plurality of work areas as shown in FIG. 8 will be explained hereinafter. In FIG. 8, it is assumed that the mowing vehicle 1 is ready for working at a certain ready position 80. In accordance with programs shown in FIGS. 9a–15, travel to a first work area 82, mowing at the first work area 82, travel from the first work area 82 to a second work area 86, mowing at the second work area 86 and travel to a goal position 88 are autonomously and sequentially performed.

FIGS. 9a–12 show a main control routine. In step S101, when the mowing vehicle is at the ready position 80, a present self-position is found by using the D-GPS. This finding of the ready position 80 is achieved by converting data detected by the D-GPS such as the latitude and longitude (and altitude if necessary) into data on a coordinate system of working region. Such the data conversion can be performed by the D-GPS position detection block 54 or the running control block 56 instead.

Figure 13:
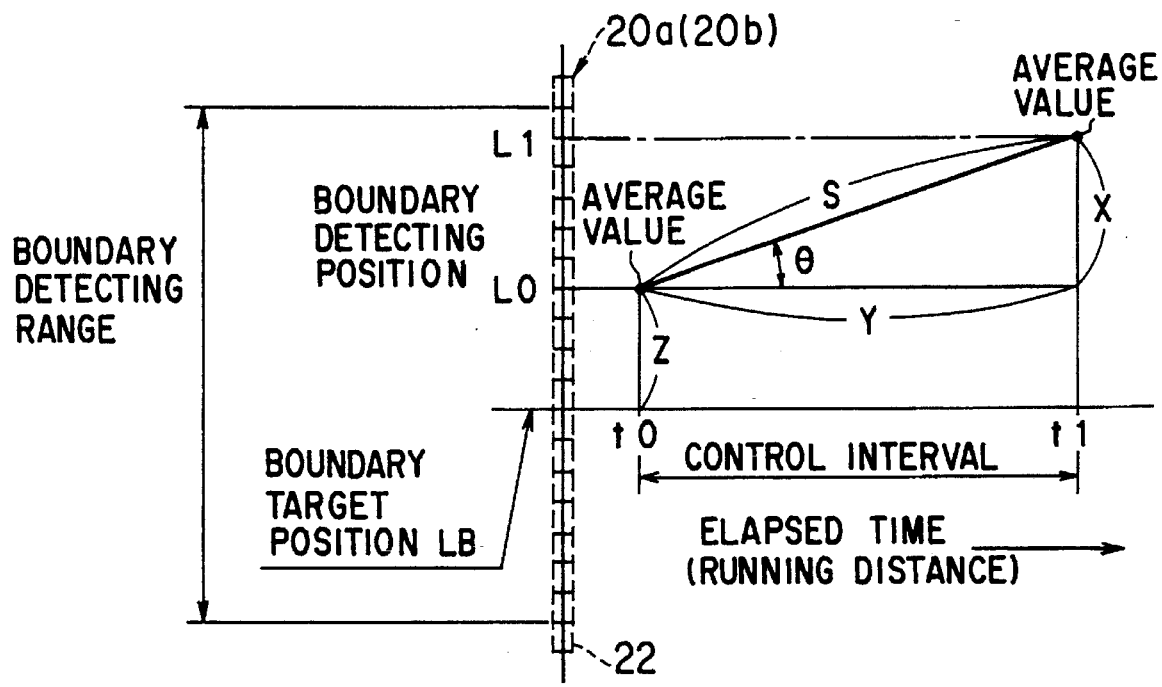
FIG. 13 is a time chart showing a possible change in an offset of the detected boundary from a desired target position thereof according to a deviation angle of the autonomous mowing vehicle.
Figure 14:
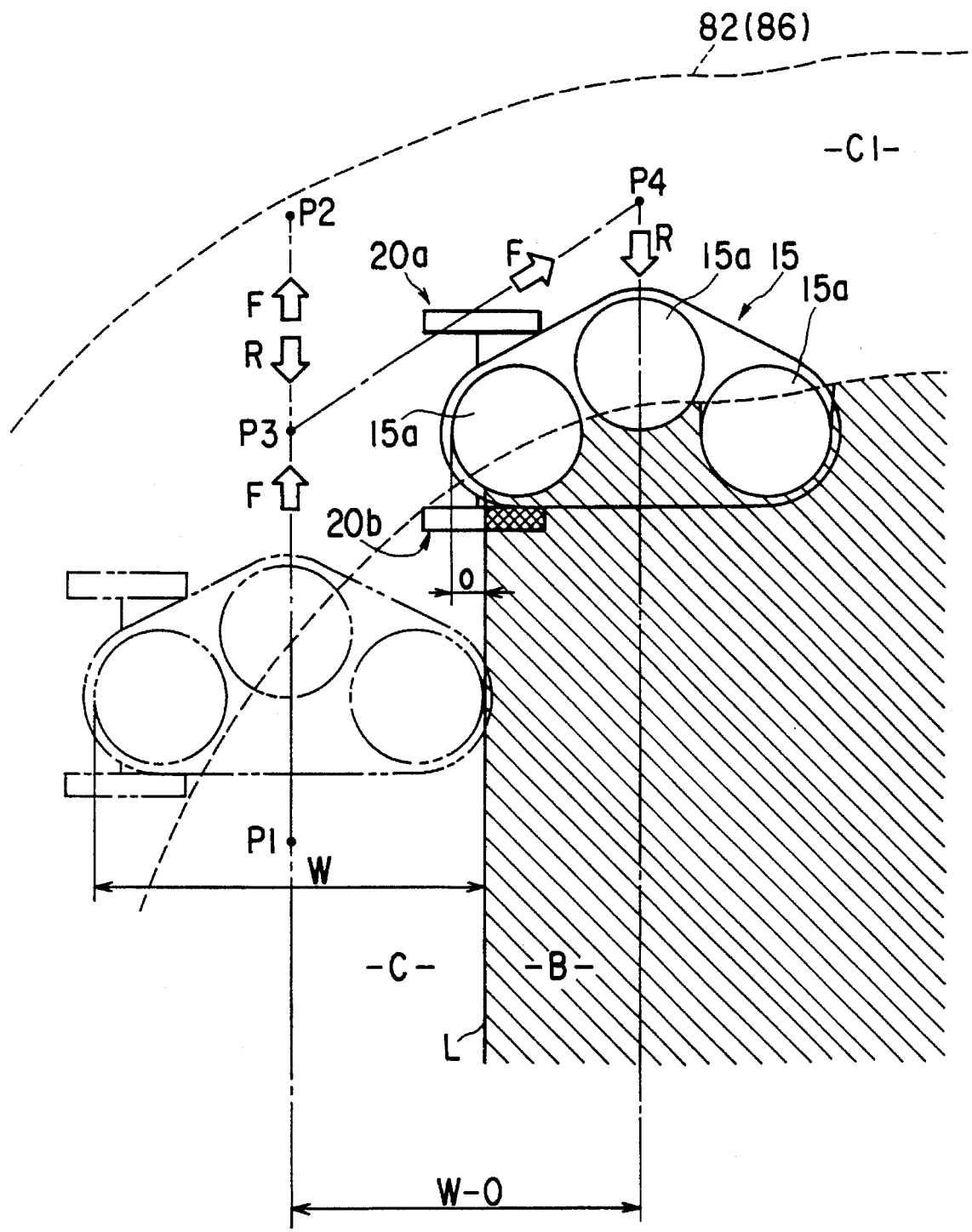
FIG. 14 is a diagram showing the lane shift of the autonomous mowing vehicle during the mowing operation.
Figure 15:
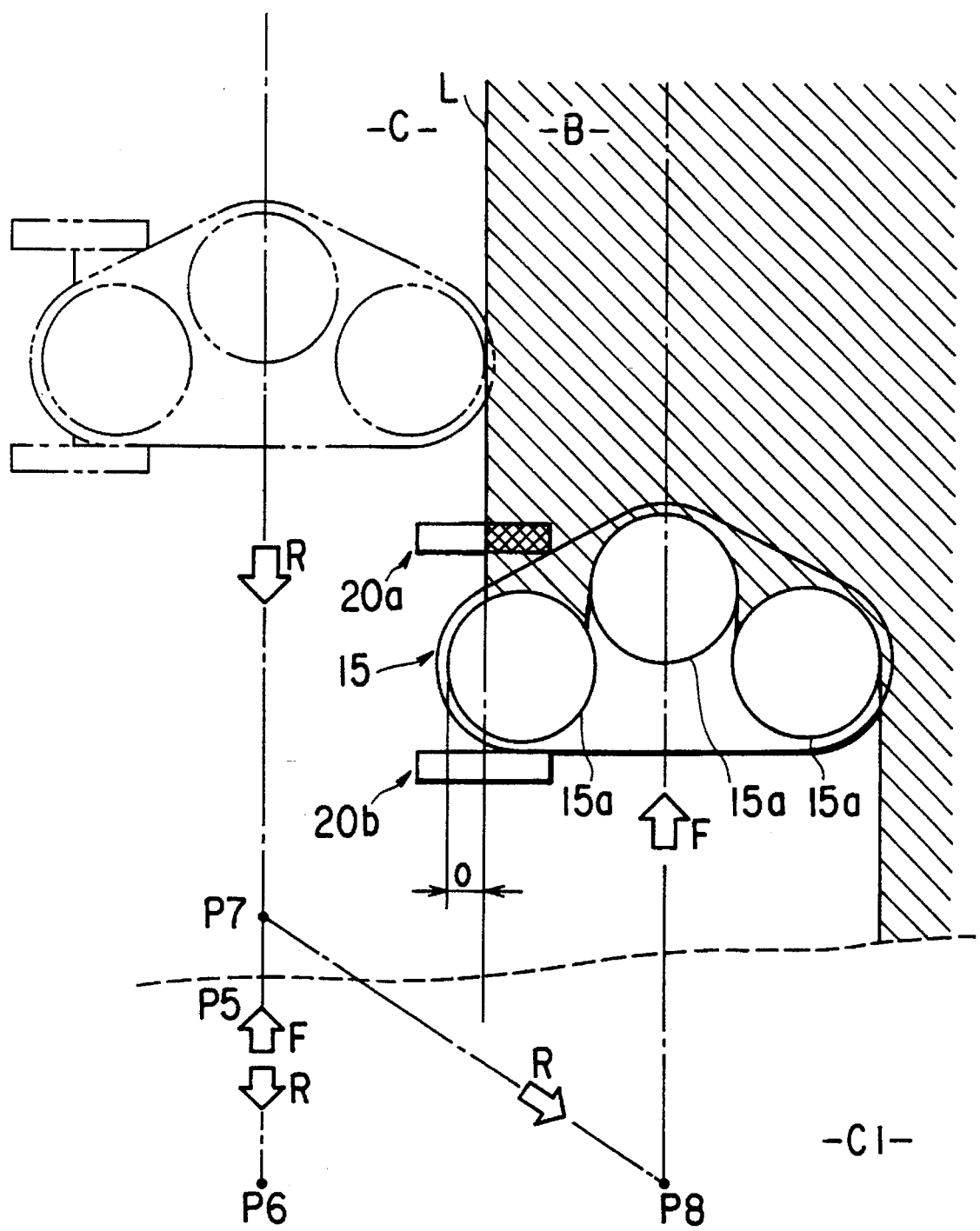
FIG. 15 is a diagram showing another example of the lane shift of the autonomous mowing vehicle during the mowing operation.

In step S102, topographical data about the first work area 132 is read by referring the work data storing block 57 to determine a route from the ready position 80 to a start position of the mowing. In step S103, an autonomous running control routine as shown in FIGS. 13–14 is prosecuted to move the vehicle to the start position of the mowing. In step S104, to start mowing with the cutting blade 15a, the hydraulic control valve 33 for the cutting blade control is opened to supply hydraulic pressure to the hydraulic clutch mechanism.

Figure 16:
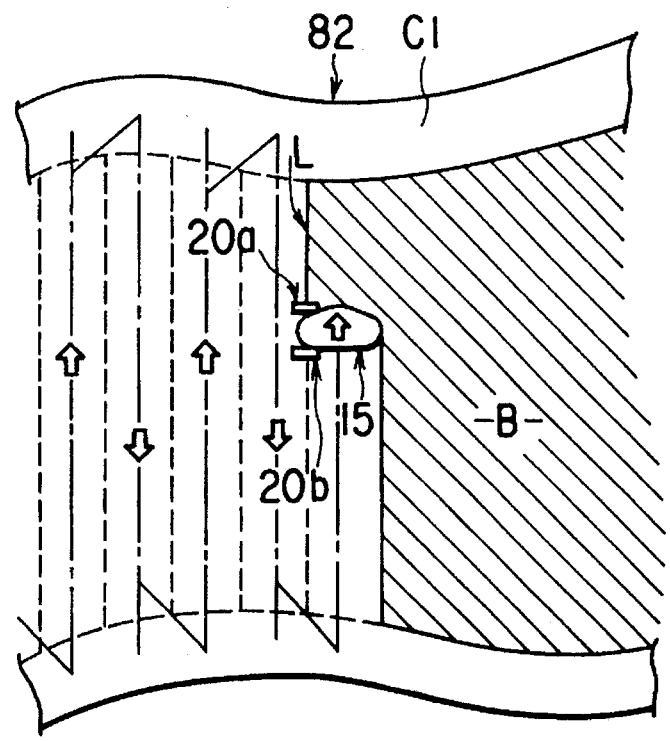
FIG. 16 is a diagram showing a running process of the autonomous mowing vehicle along the boundary.

Mowing is first performed at a periphery 83 of the work area by reference to work area data preliminarily stored in the work data storing block 57 according to the D-GPS and the dead reckoning navigation (referring to FIG. 16). That is, after detecting a present self-position, in step S105, by means of the D-GPS and/or the dead reckoning navigation in the same way as being done in step S103, a deviation of such the present self-position from the periphery 83 of the work area 82 is calculated by reference to the work data in the work data storing block 57 in step S106.

In step S107, a target steering angle for each of the front and rear wheels is determined in accordance with the deviation calculated in step S106. In step S108, the front wheel steering mechanism is manipulated through the hydraulic control valve 28a so as to steer the front wheels to the target steering angle by reference to the front wheel steering angle detected by the front wheel steering sensor 31a and the rear wheel steering mechanism is manipulated through the hydraulic control valve 28b to steer the rear wheels to the target steering angle by reference to the rear wheel steering angle detected by the rear wheel steering angle sensor 31b.

In step S109, it is determined whether a present self-position is an end position PO of the peripheral mowing, that is, whether the vehicle has reached the end position PO. When it is determined that the vehicle has not reached the end position PO, steps S105–S108 are repeated to continue the peripheral mowing. When it is determined that the vehicle has reached the end position PO, step S110 is prosecuted to turn or shift the vehicle to be ready for the mowing inside of the work area along a boundary L between a mowed field C and a not mowed field B at a constant vehicle speed (3–6 Km/h).

Further, in the present embodiment, first predetermined distance a of the peripheral is arranged to be the straight so as to be followed by the vehicle during the guided running, whereby the inside mowing of the work area is performed straight.

In step S111, one of the boundary detection device 20a and 20b is selected depending on a forward or reverse running state of the mowing vehicle 1, That is, when the forward running state of the vehicle is determined in the control unit 50, the boundary detection device 20a sitting on the front side of the cutting blade mechanism 15 is selected whereas when the reverse running state is determined, the boundary detection device 20b sitting on the rear side thereof is selected. In step S112, signals input from the respective microswitches 24 provided in the selected boundary detection device and a signal from the wheel encoder 5 are processed. In step S113, the boundary L between the mowed field C and the not mowed field B and the vehicle speed are calculated.

In the case where the vehicle is going to forwardly run along the boundary L, as shown in FIG. 2, the microswitches 24 positioned over the mowed field C are turned OFF whereas the microswitches 24 over the not mowed field B are turned ON. Accordingly, a boundary between ON and OFF of the microswitches 24 is determined as a position of the boundary L of the mowing. Further, during the reverse running of the vehicle the boundary L of the mowing is determined in the same way by means of the boundary detection device 20b on the rear side.

In the case where the vehicle is going to run forwardly along the boundary L, as shown in FIG. 2, the microswitches 24 positioned over the mowed field C are turned OFF whereas the microswitches 24 over the not mowed field B are turned ON. Accordingly, a boundary between ON and OFF of the microswitches 24 is determined as a position of he boundary L of the mowing. Further, during the reverse running of the vehicle the boundary L of the mowing is determined in the same way by means of the boundary detection device 20b on the rear side.

The detection of the boundary position L is repeated for a predetermined time period to collect data required for averaging. Such repeatedly detected positional data of the boundary L is processed by the weighted mean in step S114 every repetition. The predetermined time period is observed in step S115. After the completion of the predetermined time period, an averaged boundary position L, which is first one for the mowing at one lane in the work area, is stored in the work data storing block 57 as a first detected boundary position L0 in step S117. In step S118, it is determined that a predetermined control interval (a few seconds) has elapsed. The processing is in waiting until the predetermined control interval elapses. After the predetermined control interval elapses, steps S119–S122 are processed to calculate an averaged boundary position L as being done in steps S112–S115. In step S123, the averaged boundary position L calculated in steps S112–S115 is stored as a second detected boundary position L1 in the work data storing block 57.

Thus, the second detected boundary position L1 is generally meant as a boundary position detected after the predetermined control interval elapses from a time when the first detected boundary position L0 is detected. Then, in step S124, whether the mowing at one lane has been completed is determined. When the mowing at one lane has been completed, the program skips to step S136 whereas when it has not yet, been completed step S125 is then prosecuted.

In step S125, calculation is made of a deviation angle of the vehicle running direction with respect to the extending boundary is based on the first and second detected boundary positions L0 and L1 and a running distance S of the vehicle during the predetermined control interval, and further an offset amount Z of the detected boundary position from a predetermined target boundary position, that is, an offset to the side of a present vehicle position from a target vehicle position. As shown in FIG. 17, a difference X (=L0–L1) between the first detected boundary position L0 at time t0 and the second detected boundary position L1 at time t1 the predetermined control interval after t0 is calculated. The running distance S from time t0 to time t1 is calculated based on the vehicle speed. Accordingly, such deviation angle is calculated based on the difference X and the running distance S. Further, a difference between the first detected boundary position L0 at time t0 and the target boundary position LB is provided as the offset amount. As shown in FIG. 17, the target boundary position LB is preliminarily set between particular rocking members 22, namely, particular microswitches 24. The offset amount by which the vehicle is off to the side is determined by counting the number of the microswitches 24 between the target boundary position LB and the detected actual boundary L of the mowing. For example, assuming that pitch of the rocking members 22 is 30 mm and that the boundary L is detected between tenth and eleventh microswitches 24 from the target boundary position LB, the boundary L is calculated as being off to the left side from the target boundary position LB by 300 mm=30 mm*10. Error of the calculation must be less than length of pitch of the rocking members 22.

Thus, in accordance with such deviation angle and the offset amount Z, it is recognized which direction the vehicle is running to and how much the vehicle is off to the side (signs + and − indicating offsets to left side and right side, respectively). On the basis of the results of this recognition, in step S126, a target steering angle for each of the front and rear wheels 11a and 11b is determined so as to correct such the deviation angle and the offset. This determination of the target steering angle is achieved by referring to a table stored in the work data storing block 57 in accordance with the deviation angle and the offset amount Z as parameters.

Then, in step S127, actual steering angles of the front and rear wheels 11a and 11b are calculated based on processed signals from the front and rear wheel steering angle sensors 31a and 31b, respectively. In step S128, such the actual front wheel steering angle is compared with the target front wheel steering angle determined in step S126. Consequently, when it is determined that the actual front wheel steering angle is equal to or more than the target front wheel steering angle, then step S129 is prosecuted where the hydraulic control valve 28a for the front wheel steering is turned OFF to operate the steering mechanism 30a through the hydraulic cylinder 29a so as to reduce the steered angle of the front wheels 11a. In contrast, when the actual front wheel steering angle is less than the target steering angle, step S130 is prosecuted in which the hydraulic control valve 28a for the front wheel steering is turned ON to increase the steered angle of the front wheels 11a.

Next, in step S131, the actual rear wheel steering angle calculated in step S127 is compared with the target fear wheel steering angle determined in step S126.

Consequently, when it is determined that the actual rear wheel steering angle is equal to or more than the target rear wheel steering angle, then step S132 is prosecuted where the hydraulic control valve 28b for the rear wheel steering is turned OFF to operate the steering mechanism 30b through the hydraulic cylinder 29b so as to reduce the steered angle of the rear wheels 11b. In contrast, when the actual rear wheel steering angle is less than the target steering angle, step S133 is prosecuted in which the hydraulic control valve 28b for the rear wheel steering is turned ON to increase the steered angle of the rear wheels 11b. In step S134, subsequently, it is determined whether the predetermined control interval identical to that determined in step S118 has elapsed. Until such predetermined control interval elapses, steps S127–S134 are repeated to continue the feedback control such that the actual steering angles of the front and rear wheels 11a and 11b converges to the respective target steering angles.

After the predetermined control interval elapsed, the second detected boundary position L1 is restored as new data of the first detected boundary position L0, then skipping back to steps S119–S123 to detect new data of the second detected boundary position L1. Subsequently, new target steering angles are calculated depending on such new data of the first and second detected boundary position L0 and L1. Thus, while the mowing vehicle runs along the boundary, the detection and the correction of the offset of the vehicle body from the target boundary position LB is repeated every predetermined control interval.

When the mowing vehicle arrives at the periphery of the work area where already mowed during the periphery mowing process, all the microswitches 24 are turned OFF as mentioned above, Such a condition is detected as the end of the mowing at the present lane, in step S124. Subsequently, in step S137, whether the mowing of the first work area 82 has been all done is determined. If it is not done yet, skipping back to step S110 takes place to shift the vehicle to a next lane so as to begin the mowing thereat.

FIG. 14 schematically depicts an example of a way to shift the vehicle at the end of the lane. After the mowing vehicle 1 forwardly advances (F) and finally arrives at an end point P1 of the lane, the shift of the vehicle is performed based on the topographical data in the work data storing block 57 and control data preliminarily provided.

First, the vehicle advances more to a point P2 to avoid leaving the lawn grass around the point P1 without being mowed. After that, the vehicle reverses (R) from the point P2 to a point P3, and then advances obliquely to a point P4 to cause a predetermined overlap O. Finally, around the point P4, the direction of the vehicle is adjusted so as to set the body 1a parallel to the previous lane by controlling the steering mechanisms 30a and 30b through the respective hydraulic control valves 28a and 28b. Thus, the mowing vehicle 1 can be shifted to the side by a width less than an effective cutting width W of a group of the cutting blades 15a by the predetermined overlap O.

After the completion of the shift, the vehicle starts to reverse for the mowing at the second lane in the same way as described in steps S111–S135 in response to the boundary L detected by the boundary detection device 20b on the rear side of the cutting blade mechanism 15.

Moreover, as shown in FIG. 19, after the mowing vehicle reverses and finally reaches an end point P5 of the second lane, the vehicle is shifted to a third lane. First, the vehicle reverses more to a point P6 to avoid leaving the not mowed lawn grass around the end point P5. Then, the vehicle returns to a point P7 and reverses obliquely to a point P8 to effect the predetermined overlap O. The attitude of the vehicle is adjusted around the point P8 to set the body 1a parallel to the previous lane by means of the steering mechanisms 30a and 30b. After the shift, the vehicle starts to advance for the mowing at the third lane along the boundary. Thus, the forward running and reverse running along the boundary are alternately repeated for the mowing from lane to lane, as shown in FIG. 20.

The mowing along the boundary is continued by repeating steps S110–S137 until it is determined in step S124 that the mowing of the first work area is completed. When the mowing of the first work area is completed, the hydraulic control valve 33 for the cutting blade control is closed to stop the operation of the cutting blade mechanism 15 and then the control is proceeds from step S137 to step S138 to determine whether the mowing is completed at all of the work areas. At this moment, since the mowing at the second work area is not completed, the control goes back to step S102 to arrange a route 85 from the first work area 82 to the second work area 86. Then the vehicle moves to the second work area along the arranged route in accordance with the autonomous running control routine described in FIGS. 13 and 14 and performs the mowing thereat.

In time, when the mowing is completed at all of the work areas, a return route 87 to the goal position 88 is arranged by reference to the work data storing block 57 in FIG. 6 step S139. Subsequently, in step S140, the vehicle goes back to the goal position 88 in accordance with the autonomous running control routine described in FIGS. 13 and 14 and then stops thereat.

Next, the autonomous running through the routes 81, 83, 85 and 87 according to the autonomous running control routine described in FIGS. 13 and 14 is explained hereinafter. Although in the foregoing explanation of the main routine, the routes 81, 83, 85 and 87 are arranged based on data of the self-position and work data in the work data storing block 57, fixed routes may be preliminarily stored in the work data storing block 57.

The D-GPS is better than the single GPS in the point of accuracy of findings. However, it sometimes happens that adequately accurate data by the D-GPS can not be timely obtained during the autonomous running control due to the pick-up conditions of the satellites or wave receiving conditions. Therefore, once information about the accuracy of the position presently detected by the D-GPS is obtained in step S201, such information about the accuracy is compared with a predetermined evaluation level of the accuracy in step S202 and then whether the accuracy by the D-GPS satisfies the predetermined level is determined.

If the accuracy by the D-GPS satisfies the predetermined level, the travel speed of the mowing vehicle 1 is so controlled as to be an usual speed (e.g. 5 km/h) stored in the work data storing block 57 in step S204. Then, in step S205, a deviation of the vehicle position is calculated in accordance with the positional information by the D-GPS and the route information; and in step S206, target steering angles to be steered to of the front and rear wheels are determined in accordance with such deviation.

Subsequently, in step S207, the front and rear steering mechanisms 30a and 30b are so operated and controlled through the hydraulic control valves 28a and 28b that the actual steering angles of the front and rear wheels are converged to the target steering angles, respectively. In step S208, a present vehicle position found by the D-GPS is compared with a final position of the route where the vehicle is headed for, and in step S209, whether the vehicle arrives to the final position is determined. Accordingly, if the vehicle has not arrived to the final position yet, step S204 is repeated to continue the running along the route depending on new data of the present position found by the D-GPS whereas if the vehicle arrives to the final position, the vehicle is stopped in step S225.

In contrast, in the case where the accuracy of the D-GPS does not satisfy the predetermined level in step S203, the autonomous running according to the dead reckoning navigation is performed subsequent to step S210. That is, in step S210, the travel speed of the vehicle is set to a low speed (e.g. 3 km/h) stored in the work data storing block 57 to minimize accumulated error of the dead reckoning navigation due to slipping of the wheels. Then, in step S211, a deviation of the vehicle position from the route is calculated in accordance with the positional information by the dead reckoning navigation and the route information.

Subsequently, in step S212, target steering angles to be steered to of the front and rear wheels are determined in accordance with such deviation. Moreover, in step S213, the front and rear steering mechanisms 30a and 30b are so operated and controlled through the hydraulic control valves 28a and 28b that the actual steering angles of the front and rear wheels are converged to the target steering angles, respectively. In step S214, a present vehicle position found by the dead reckoning navigation is compared with a final position of the route where the vehicle is headed for, and in step S215, whether the vehicle arrives at the final position is determined.

If the final position has not been made yet, step S210 is repeated to continue the running along the route depending on new data of the present position found by the dead reckoning navigation whereas if the final position is made, the vehicle is stopped in step S216. Then, in step S217, a present vehicle position is repeatedly detected by the D-GPS for a predetermined data accumulation time period and each data is stored in the RAN area of the work data storing block 57. Such predetermined data accumulation time period is observed by steps S218–S219. In step S218, an elapsed time period is compared with the predetermined data accumulation time period, and then in step S219, whether the predetermined time period has elapsed is determined. If the predetermined time period has not elapsed, the accumulation of data is repeated in step S217 whereas if the predetermined time period has elapsed, the accumulation is terminated. Even if it is determined in step S203 that the position found by the D-GPS is not accurate, it is possible to obtain data the accuracy of which is improved by averaging accumulated data.

After that, in step S220, accumulated data is averaged to define an average value as a present vehicle position. In step S222, such present vehicle position is compared with the final position where the vehicle is headed for, and in step S222, it is determined whether the final position is really reached. When it is determined, consequently, that the final position is really reached, the vehicle is maintained to stopped in step S225. In contrast, in the case where the final position is not really reached, it is recognized that the data by the dead reckoning navigation must include error. To cancel such the error, therefore, in step S223, the data detected by the dead reckoning navigation is corrected by the average value of data detected by the D-GPS. Then, after resetting a route to the final position in step S224, the vehicle is restarted in step S210. Steps S210–S224 are repeated until the final position determined by the dead reckoning navigation is authorized or justified by the D-GPS in steps S217–S222.

Thus, even if the accuracy of the D-GPS becomes worse during the vehicle runs, the vehicle can run to the final position of the route depending on the dead reckoning navigation with the assistance of the averaged D-GPS findings.

Figure 11:
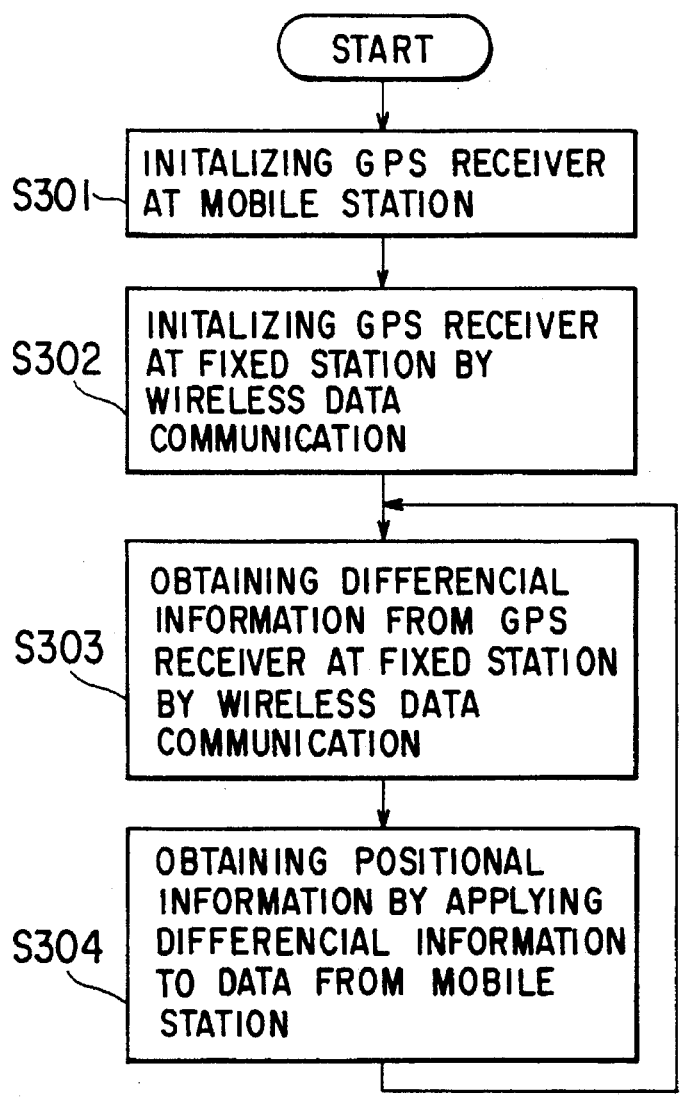
FIG. 11 is a flow chart of a D-GPS wireless communication routine.
Figure 12:
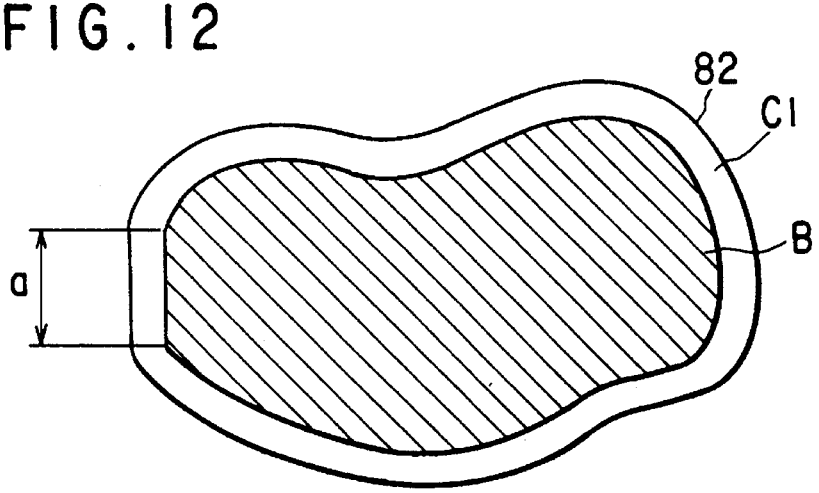
FIG. 12 is a diagram showing a work area where the periphery has been mowed as a first step of mowing.

Further, the data communication between the fixed station 40 and the mobile station according to the D-GPS is performed by the D-GPS wireless communication routine shown in FIG. 11 in the form of pocket data. In this routine, the mobile station GPS receiver 25 is initialized in step S301 and then the fixed station GPS receiver 43 is initialized by the data communication through the wireless communication devices 26 and 46 in step S302. In step S303, differential information is received from the fixed station 40 by the wireless data communication.

Next, in step S304, the D-GPS position detection block 54 applies the differential information from the fixed station 40 to data received from the mobile station GPS receiver 25 for the differential calculation to determine a self-position of the vehicle, such information being sent to the running control block 56. Steps S303–S304 are repeated for the next data processing. The differential calculation may be performed as a function peculiar to the mobile station receiver 25.

Although in the present embodiment, each rocking member 22 of the boundary detection device 20a (20b) is mounted on the single shaft 21, it is not limited to this. In short, it is sufficient that rocking members 22 are rotatably supported. For instance, means for individually mounting each rocking member 22 can be adopted instead.

Further, although in the present embodiment, it is so arranged that during the mowing, the not mowed field B is always seen on the left side of the mowing vehicle 1 and the boundary detection devices 20a and 20b are provided on the front and rear sides of the cutting blade mechanism 15, respectively, under the left half of the vehicle body, it can be arranged that the not mowed field B is seen on the right side of the vehicle. In this case, the boundary detection device must be arranged on the front and rear sides of the cutting blade mechanism 15 under the right half of the vehicle body. Furthermore, to deal with both arrangements, the boundary detection devices can be provided on both sides of the cutting blade mechanism 15.

Further, although the unmanned vehicle is illustrated in the present embodiment, the present invention can be also adopted to a manned vehicle.

Figures 17A, 17B:
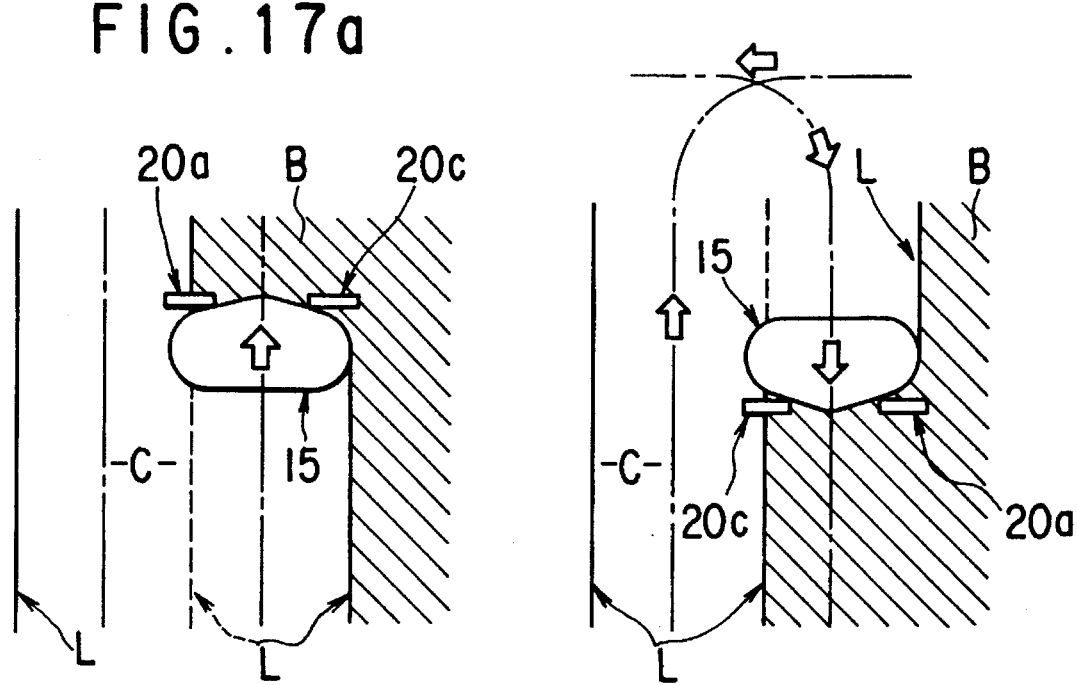
FIGS. 17a and 17b are diagrams showing a further example of the lane shift of the autonomous mowing vehicle during the mowing operation.

Further, the way to shift the mowing vehicle 1 to the next lane at the end of the present lane during the mowing at the work area can be arranged as shown in FIG. 17a, 17b in which so-called switch back turn is performed to cause the vehicle to always run forwardly. In this case, the boundary detection devices 20a and 20c should be arranged on the front-right side and front-left side of the cutting blade mechanism 15, respectively, and one of which devices is selected in step S111 of the aforementioned main control routine.

Figure 18:
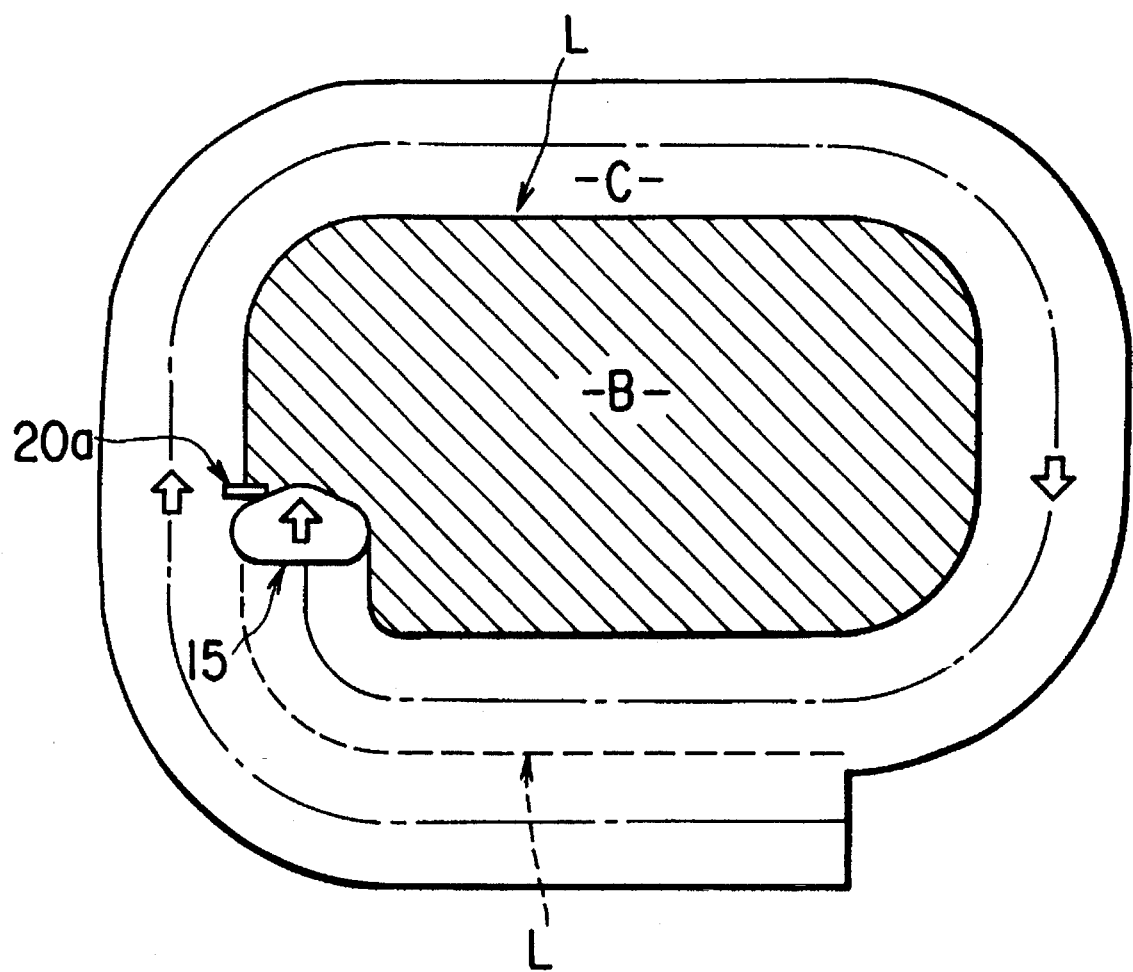
FIG. 18 is a diagram showing a mowing operation in a circle.

Further, as shown in FIG. 18, it can be arranged that the vehicle spirally or circularly runs at the work area for the mowing. In this case, a first round at the periphery of the work area is conducted by the D-GPS or the dead reckoning navigation, and later rounds are guided by the mowing boundary. Since the vehicle spirally runs, the detection of the boundary requires just a single boundary detection device 20a being provided on one side with respect to the cutting blade mechanism 15 depending on a direction of the spiral running, which renders the step S111 of the aforementioned main control routine negligible. Moreover, since the vehicle spirally runs, the lane shift of the vehicle is not required as being done in step S110 of the main control routine. Furthermore, since in this arrangement, that all the microswitches of the boundary detection device are turned OFF means the completion of the mowing at the work area, the steps S136 and S137 are not required and therefore the step S138 may be immediately performed subsequent to the detection of OFF conditions of all the microswitches in either steps S116 or S123.

Figure 19A:
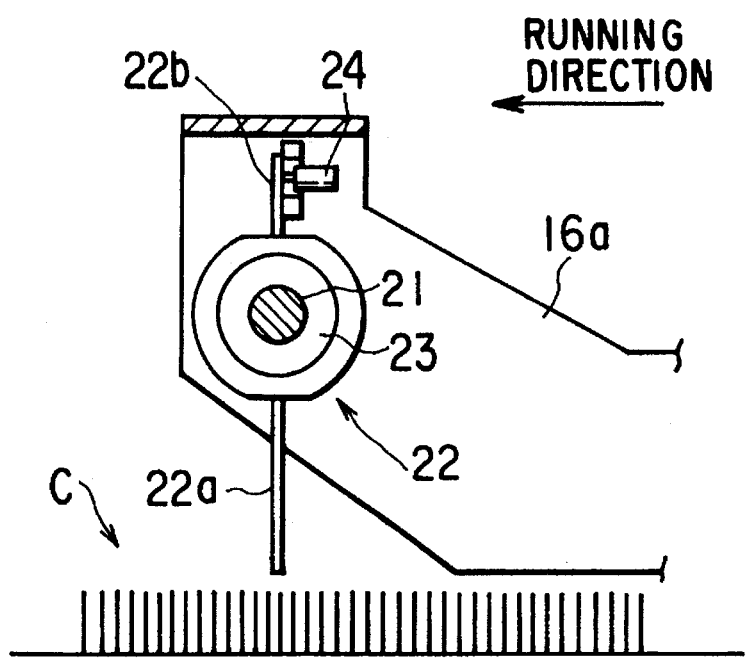
FIGS. 19a and 19b are diagrams showing the second embodiment of the boundary detecting device.
Figure 19B:
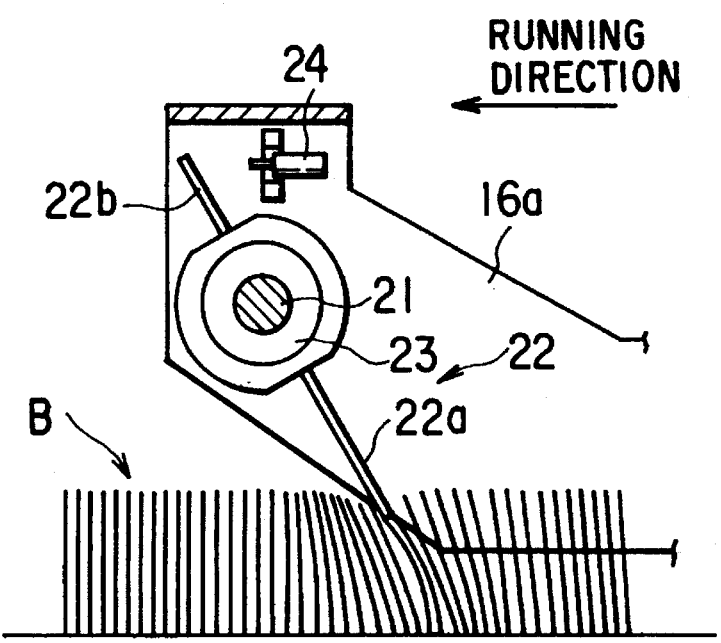

Further, the microswitch 24 of the boundary detection device can be provided on the rear side with respect to the switching portion 22b of the rocking member 22 as shown in FIGS. 19a, 19b, which is turned OFF over the not mowed field and ON over the mowed field.

In view of the foregoing, according to present invention, since the boundary between the mowed field and the not mowed field at the work area can be determined depending on the rocking states of the rocking members, the detection of the boundary is certainly detected without being influenced by the work environment such as splashed mud or dust.

Further, according to the present invention, since the sensing portion of the rocking member is arranged so as to set a clearance between the lower end of the sensing portion and ground approximately the same as or a little bit larger than the minimum ground clearance of the cutting blade, the boundary of the mowing is certainly detected even if height of the lawn grass is short or even if height difference between the mowed grass and the not mowed grass is small.

While the presently preferred embodiments of the present invention have been shown and described, it is to be understand that these disclosures are for the purpose of illustration and that various changes and modifications may be made without departing from the scope of the invention as set forth in the appended claims.

What is claimed is:

1. An apparatus for detecting an extending boundary between fields mowed and not mowed by a cutting blade mechanism of an autonomous vehicle for the mowing of lawn grass, comprising:

a plurality of rocking members provided to be aligned in a lateral direction of the vehicle under a body of the vehicle;

plurality of rocking condition sensors provided to detect rocking conditions of the respective rocking members; and a control unit provided to determine a boundary between a rocking member rocked by the lawn grass and a rocking member not rocked as the boundary between the mowed field and not mowed field in response to signals from said rocking condition sensors.

2. The apparatus according to claim 1, wherein said control unit comprises:

boundary recognition means responsive to said signals from said rocking condition sensors for recognizing positions of the boundary with respect to the body of the vehicle every predetermined control interval;

running control means for calculating an offset of the vehicle body to the side from a predetermined target position in accordance with a position of the boundary recognized by said running control means;

vehicle control means for calculating a target steering angle of wheels of the vehicle so as to reduce said offset; and steering control means for controlling an actual steering angle of said wheels to said target steering angle.

3. The apparatus according to claim 2, wherein said control unit further comprises:

running distance detection means for calculating a running distance by which the vehicle has run for said predetermined control interval; wherein said running control means further calculates a deviation angle of a direction to which the vehicle is running, with respect to the extending boundary based on said running distance and a difference between first and second boundary positions sequentially recognized by said boundary recognition means; and said vehicle control means calculates said target steering angle based on said deviation angle in addition to said offset.

4. The apparatus according to claim 1, further comprising:

a shaft extending in the lateral direction of the vehicle to rotatably support said plurality of rocking members.

5. The apparatus according to claim 1, wherein each of said plurality of rocking members comprises:

a sensing portion extending downwardly from a rocking center and having a lower end with a clearance from the ground approximately same as a minimum ground clearance of said cutting blade mechanism; and a switching portion facing corresponding one of said plurality of sensors to change the status thereof when each of said rocking members is rotated by the lawn grass not mowed.

6. The apparatus according to claim 5, wherein each of said plurality of sensors is a microswitch being turned on by said switching portion of the corresponding one of said rocking members.

7. An autonomous mowing vehicle having a body, and at least one cutting blade under said body, comprising:

boundary detection means for detecting a field mowed by said cutting blade and a field not mowed by said cutting blade;

boundary recognition means for recognizing a presence of a boundary between the field mowed and the field not mowed and for recognizing an absence of the boundary, respectively; and running control means for controlling the vehicle so as to run along said boundary when the presence of said boundary is recognized by said boundary recognition means and to shift said vehicle to a mowing lane when the absence of a boundary is recognized by said boundary recognition means; and said boundary detection means includes two sets of boundary detection mechanisms provided on front and rear sides with respect to said cutting blade respectively.

8. An autonomous vehicle having a body and at least one cutting blade under said body, comprising:

boundary detection means for detecting a field mowed by said cutting blade and a field not mowed by said cutting blade;

boundary recognition means for recognizing a presence and absence of a boundary between said field mowed and said field not mowed;

running control means for controlling said vehicle so as to run along said boundary when said presence of said boundary is recognized by said boundary recognition means and to shift a mowing lane when said absence of a boundary is recognized by said boundary recognition means; and said boundary detection means includes two sets of boundary detection mechanisms provided on front and rear sides with respect to said cutting blade and alternately detects said boundary while said vehicle moves respectively forwardly and rearwardly and changes from a lane to another lane along said boundary.

9. An autonomous mowing vehicle having a body and at least one cutting blade under said body, comprising:

boundary detection means for detecting a field mowed by said cutting blade and a field not mowed by said cutting blade;

boundary recognition means for recognizing a presence and absence of a boundary between said field mowed and said field not mowed;

running control means for controlling said vehicle so as to run along said boundary when said presence of said boundary is recognized by said boundary recognition means and to shift a mowing lane when said absence of a boundary is recognized by said boundary recognition means; and said boundary detection means includes two sets of boundary detection mechanisms provided on left and right sides with respect to said cutting blade, respectively, in a case where either forward running or reverse running is performed for the mowing along said boundary.

10. An autonomous mowing vehicle having a body, and at least one cutting blade under said body, comprising:

boundary detection means for detecting a field mowed by said cutting blade and a field not mowed by said cutting blade;

boundary recognition means for recognizing a presence and absence of a boundary between said field mowed and said field not mowed;

running control means for controlling said vehicle so as to run along said boundary when said presence of said boundary is recognized by said boundary recognition means and to shift a mowing lane when said absence of a boundary is recognized by said boundary recognition means; and said boundary detection means includes only one set of boundary detection mechanism provided on only one side of said cutting blade for detecting a spiral geometry of said boundary as said vehicle spirally moves along the boundary.

11. A method for controlling the autonomous running of a vehicle having at least one cutting blade provided under a body of said vehicle for mowing at a work area, the method comprising the steps of:

locating a ready position of said vehicle by using a D-GPS system;

generating a route from said ready position to a mowing start position;

moving said vehicle to said mowing start position;

mowing a periphery of said work area by reference to data stored in a memory;

detecting a field mowed by said cutting blade and a field not mowed;

recognizing presence and absence of a boundary between the mowed field and the not mowed field by a detection mechanism;

controlling the vehicle so as to run along said boundary when the presence of said boundary is recognized;

advancing the vehicle by a first predetermined distance after the absence of said boundary is recognized in order to avoid leaving lawn grass without being mowed;

backing the vehicle by a second predetermined distance after the advance by the first predetermined distance; and shifting the vehicle obliquely to a next lane to be mowed.

12. A method for controlling the autonomous running of a vehicle having at least one cutting blade provided under a body of said vehicle for mowing at a work area, the method comprising the steps of:

locating a ready position of said vehicle by using a D-GPS system;

generating a route from said ready position to a mowing start position;

moving said vehicle to said mowing start position;

mowing a periphery of said work area by reference to data stored in a memory;

detecting a field mowed by said cutting blade and a field not mowed;

recognizing presence and absence of a boundary between the mowed field and the not mowed field by a detection mechanism;

controlling the vehicle so as to run along said boundary when the presence of said boundary is recognized;

switching back the vehicle after the absence of said boundary is recognized;

backing the vehicle by a second predetermined distance after the advance by the first predetermined distance; and shifting the vehicle obliquely to a next lane to be mowed.

13. An apparatus for detecting a boundary extending between fields mowed and not mowed by a cutting blade mechanism of an autonomous mowing vehicle, comprising distance detecting means for calculating a running distance by integrating vehicle speed and for generating a distance signal, estimated position detecting means responsive to said distance signal and a directional change signal from a dead reckoning position detecting means for determining an estimated present position of said vehicle by calculating a total running distance from a reference point and for producing an estimated position signal, fixed communication means for transmitting differential information of a geographical position of said vehicle calculated by a group of satellites and for producing a position signal, and position detecting means responsive to said position signal for determining a present position of said vehicle in accordance with navigation messages from said group of satellites and for generating a present position signal, the apparatus further comprising:

a plurality of rocking members supported on a shaft in said apparatus under a body of said vehicle for rocking in a moving direction of said vehicle when a lower end of said rocking members touches grass;

a plurality of rocking condition sensors mounted on said body for detecting a rocking condition of said rocking members and to produce a rocking condition signal when an upper sensing portion of said rocking members touches said rocking condition sensors;

boundary recognition means responsive to said rocking condition signal for determining said boundary and to generate a positional data signal; and control means responsive to said positional data signal, said distance signal, said estimated position signal and said present position signal for determining said boundary between a group of said rocking members rocked by the grass and another group of said rocking members unrocked by said grass so as to correctly detect said boundary, so that responsive thereto the vehicle performs optimum mowing by said cutting blade mechanism.

14. The method according to claim 11, further comprising the steps of repeating the above steps until said absence of said boundary is recognized all over said work area;

moving said vehicle to a next work area and repeating the steps above; and returning said vehicle to a goal position near said ready position.

15. The method according to claim 12, further comprising the steps of repeating the above steps until said absence of said boundary is recognized all over said work area;

moving said vehicle to a next work area and repeating the steps above; and returning said vehicle to goal a position near said ready position.

* * * * *